(12) United States Patent
Gage

(10) Patent No.: US 10,432,399 B2
(45) Date of Patent: Oct. 1, 2019

(54) METHOD AND APPARATUS FOR STORING CONTEXT INFORMATION IN A MOBILE DEVICE

(71) Applicant: William Anthony Gage, Stittsville (CA)

(72) Inventor: William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 127 days.

(21) Appl. No.: 15/644,012

(22) Filed: Jul. 7, 2017

(65) Prior Publication Data

US 2018/0019871 A1    Jan. 18, 2018

Related U.S. Application Data

(60) Provisional application No. 62/361,251, filed on Jul. 12, 2016.

(51) Int. Cl.
*H04L 9/32* (2006.01)
*H04W 12/04* (2009.01)
(Continued)

(52) U.S. Cl.
CPC .............. *H04L 9/32* (2013.01); *G06F 21/606* (2013.01); *G06F 21/6209* (2013.01);
(Continued)

(58) Field of Classification Search
CPC ....... H04L 9/32; H04L 9/0894; H04L 9/3239; H04L 2209/34; H04L 2209/30;
(Continued)

(56) References Cited

U.S. PATENT DOCUMENTS

| 8,590,057 B1* | 11/2013 | Mayblum | ............. H04L 9/0891 |
| | | | 726/17 |
| 2004/0015689 A1* | 1/2004 | Billhartz | ............... H04L 63/061 |
| | | | 713/156 |

(Continued)

FOREIGN PATENT DOCUMENTS

| WO | 2013189533 A1 | 12/2013 |
| WO | 2015084878 A1 | 6/2015 |

OTHER PUBLICATIONS

International Search Report dated Oct. 11, 2017 for corresponding International Application No. PCT/CN2017/092386 filed Jul. 10, 2017.

(Continued)

*Primary Examiner* — Meng Li

(57) ABSTRACT

A method and apparatus for storing and using context information in a wireless communication network are provided. Context information is encrypted and transmitted to a mobile device for storage. A cryptographic key usable for decrypting the context information is stored at a radio access node or other node in the network and an indication of the key and the location of the key is stored at the mobile device. The mobile device transmits a message which includes the key identifier and location and the encrypted context information. The message may further include application data and the encrypted context information may include an indication of a further key for encrypting and decrypting application data in transmissions between the mobile device and the communications network. The encrypted context information may include the further key.

24 Claims, 12 Drawing Sheets

(51) Int. Cl.

| | |
|---|---|
| *H04W 12/06* | (2009.01) |
| *G06F 21/60* | (2013.01) |
| *G06F 21/62* | (2013.01) |
| *H04W 12/02* | (2009.01) |
| *H04W 12/10* | (2009.01) |
| *H04L 9/08* | (2006.01) |
| *H04W 12/00* | (2009.01) |
| *H04W 8/24* | (2009.01) |
| *G06F 21/30* | (2013.01) |

(52) U.S. Cl.
CPC .......... *H04L 9/0894* (2013.01); *H04L 9/3239* (2013.01); *H04W 8/24* (2013.01); *H04W 12/005* (2019.01); *H04W 12/02* (2013.01); *H04W 12/04* (2013.01); *H04W 12/06* (2013.01); *H04W 12/10* (2013.01); *G06F 21/30* (2013.01); *H04L 2209/30* (2013.01); *H04L 2209/34* (2013.01); *H04L 2209/80* (2013.01)

(58) Field of Classification Search
CPC .. H04L 2209/80; H04W 12/10; H04W 12/02; H04W 12/06; H04W 12/04; G06F 21/6209; G06F 21/606; G06F 21/30
See application file for complete search history.

(56) References Cited

U.S. PATENT DOCUMENTS

| | | | |
|---|---|---|---|
| 2005/0089007 A1* | 4/2005 | Semper | H04W 76/12 370/349 |
| 2005/0132186 A1 | 6/2005 | Khan | |
| 2007/0064948 A1 | 3/2007 | Tsirtsis et al. | |
| 2008/0170699 A1* | 7/2008 | Fratti | H04W 12/02 380/278 |
| 2009/0202077 A1* | 8/2009 | Hils | G06F 21/10 380/277 |
| 2014/0269499 A1 | 9/2014 | Pang et al. | |
| 2015/0188943 A1* | 7/2015 | Williams | H04L 63/0272 713/151 |
| 2017/0013454 A1* | 1/2017 | Lee | H04W 76/38 |

OTHER PUBLICATIONS

Kelvin Au et al, "Uplink Contention Based SCMA for 5G Radio Access", Jul. 2014.

Kaijie Zhou, "Dynamic Resource Allocation for Machine-Type Communications in LTE/LTE-A with 7 Contention-Based Access", Apr. 2013.

* cited by examiner

METHOD AND APPARATUS FOR STORING CONTEXT INFORMATION IN A MOBILE DEVICE

CROSS-REFERENCE TO RELATED APPLICATIONS

The present application claims priority from U.S. Provisional Patent Application No. 62/361,251, filed on 12 Jul., 2016 and incorporated herein by reference in its entirety.

FIELD OF THE INVENTION

The present invention pertains to the field of wireless communications and in particular to a method and apparatus for storing context information in a mobile device.

BACKGROUND

Wireless communication systems such as Long Term Evolution (LTE) systems, $5^{th}$ generation (5G) wireless communication systems, and the like, are subject to many design challenges. To conserve battery power, a user equipment (UE) in such a system will often enter a low energy mode of operation when it does not have data to transmit. And to conserve radio resources, the radio access network (RAN) may not dedicate radio resources to a UE in this mode either for uplink data transmission or for signalling. As a result, a mobile UE may move into the coverage of a different cell without notifying the RAN. This mode of operation is particularly prevalent for machine-type communications (MTC) which is characterised as infrequent, often unpredictable, uplink transmission of very short data packets (e.g. tens of bytes); background traffic for web-based applications on a UE (e.g. keep-alive messages, status updates) also exhibits similar characteristics.

When a UE does have new data to transmit, there is a requirement that the UE be able to conclude the data transfer with low delay. In order to do this, mechanisms must be provided to preserve the UE context needed by the RAN to process any new transmission in order to avoid the delay and signalling overheads associated with re-creating that context. A UE operating in such a mode is said to be "dormant," or alternatively "lightly connected" or "inactive."

Concluding the data transfer with low delay also means that the preserved UE context must be made available for use at the new serving cell in a timely manner.

Conventionally, UE context is preserved by the network using either a centralised or distributed storage model. Centralised context data storage uses a specialised network element (e.g. a data server) to store the preserved context. Updates are forwarded to the central data store from a serving base station and retrieved from the central data store by a target or new serving base station. Like all centralised solutions, there are potential issues with responsiveness, scalability, cost, and reliability of the central data store. Distributed context data storage uses the base stations as data stores. A serving base station provides a UE with a context identifier that the UE must provide to a new serving base station. The context identifier can be used by the new serving base station to determine the base station storing the context and can be used by the storing base station to locate the preserved context. Procedures may be provided to migrate the preserved context to a different base station (e.g. the new serving base station) and to update the context identifier held by the UE. With this solution, there are potential issues with responsiveness, especially in deployments with limited connectivity between base stations, with the cost required to provide reliable data storage in a base station, and with the cost required to provide the transport facilities necessary for timely communications amongst base stations.

Therefore there is a need for a method and apparatus for storing context information that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for storing or retrieving context information. In accordance with embodiments of the present invention, there is provided a method for supporting communication between a mobile device and a wireless communication network. The method may be performed by an infrastructure apparatus of the network, such as a base station, an evolved node B (eNodeB) or a gNodeB, or other network node or combination of nodes. The method includes encrypting context information using a device in the wireless communication network separate from the mobile device, the context information corresponding to the mobile device. The method further includes transmitting the encrypted context information toward the mobile device for storage in the mobile device. The transmission of the encrypted context information may be a wireless transmission.

In some embodiments, the method further includes storing a key, such as a cryptographic key, usable for decrypting the context information in a location which is separate from the mobile device, and transmitting, to the mobile device, an indication of at least one of the key and the storage location. The transmitted indication is then received and stored in the mobile device. The method may then further include receiving a message from the mobile device, the message including the encrypted context information and the stored indication of at least one of the key and the storage location, retrieving the key based on the indication of at least one of the key and the storage location, and using the retrieved key to decrypt the encrypted context information. In some embodiments, the message further comprises encrypted uplink data, and the encrypted context information includes an indication of a further cryptographic key usable for decrypting the encrypted uplink data. In this case, the method may further include obtaining the further key based on the encrypted context information following decryption, and decrypting the encrypted uplink data using the obtained further cryptographic key.

In accordance with embodiments of the present invention, there is provided a method for supporting communication between a device (e.g. a mobile device) and a wireless communication network. The method may be performed by the device. The method includes wirelessly receiving encrypted context information at the device. The method further includes storing the encrypted context information in the device.

In some embodiments, the above method further includes wirelessly receiving an indication of at least one of a cryptographic key and an indication of a location which is separate from the device and which stores a cryptographic key usable for decrypting the context information, and storing the received indication of at least one of the key and the storage location in the device. The indication of the key may include the indication of the location. In some embodiments, the method further includes wirelessly transmitting a message from the device. The message may be transmitted in response to a page, or in response to a trigger to transmit uplink data, or in response to a trigger to re-establish mobile device context. The message includes the encrypted context information and the indication of at least one of the key and the storage location, as retrieved from storage on the device. The method may then further include encrypting uplink data and including the encrypted uplink data in the message. The encrypted context information may include an indication of a cryptographic key usable for decrypting the encrypted uplink data. Alternatively, when the message is transmitted from the device in response to a wirelessly received paging message (or paging indication), the encrypted context information includes an indication of a further cryptographic key stored by the device, and the method further comprises wirelessly receiving downlink data decryptable using the further cryptographic key, and decrypting the downlink data by the device.

In accordance with embodiments of the present invention, there is provided a method, in a mobile device, for communication between the mobile device and a wireless communication network. The method includes wirelessly transmitting, from the mobile device, encrypted context information corresponding to and stored by the mobile device. The method further includes wirelessly transmitting, from the mobile device, an indication of a cryptographic key, the indication stored by the mobile device and usable for retrieval of the cryptographic key, the cryptographic key stored separately from the mobile device and usable for decrypting the context information.

In accordance with embodiments of the present invention, there is provided an infrastructure apparatus (e.g. comprising a radio access node or other network node) of a wireless communication network, the apparatus comprising a processor, a memory, a network interface, and optionally a wireless transmitter and a wireless receiver. The apparatus is configured, for example via operation of the processor (in control of the network interface, wireless transmitter and receiver) executing instructions stored in memory, to encrypt, using the processor, context information corresponding to a mobile device. The apparatus is further configured to transmit using the network interface, the encrypted context information toward the mobile device for storage in the mobile device. An indication of a cryptographic key may also be transmitted toward the mobile device for storage thereby.

In accordance with embodiments of the present invention, there is provided an infrastructure apparatus (e.g. comprising a radio access node or other network node) of a wireless communication network, the apparatus comprising a processor, a memory, a network interface, and optionally a wireless transmitter and a wireless receiver. The apparatus is configured to wirelessly receive from a mobile device, using the network interface, encrypted context information corresponding to the mobile device. The apparatus is further configured to decrypt, using the processor, the context information corresponding to the mobile device. The apparatus may further receive, from the mobile device, an indication of a cryptographic key for decrypting the context information, and retrieve the key from a storage location based on the indication.

In accordance with embodiments of the present invention, there is provided a device (e.g. a mobile device) for communication communicatively coupled to a wireless communication network, the device comprising a processor, a memory, a wireless transmitter and a wireless receiver. The device is configured, for example via operation of the processor (in control of the wireless transmitter and receiver) executing instructions stored in memory, to wirelessly receive encrypted context information (related to the device). The device is further configured to store the encrypted context information in the device. The device further receives an indication of a cryptographic key stored separately from the device and usable for decrypting the context information, and is configured to store the indication of a cryptographic key in the device.

In accordance with embodiments of the present invention, there is provided a mobile device communicatively coupled to a wireless communication network, the mobile device comprising a processor, a memory, a wireless transmitter and a wireless receiver. The mobile device is configured to retrieve, from the memory, encrypted context information corresponding to the device and an indication of a cryptographic key. The mobile device is further configured to wirelessly transmit the encrypted context information. The mobile device is further configured to wirelessly transmit the indication of the cryptographic key, the indication usable for retrieval of the cryptographic key, the cryptographic key stored separately from the device and usable for decrypting the context information.

It will be appreciated that in the above discussion, methods and apparatus of embodiments of the present invention are discussed. Some of the embodiments add further clarification or further steps to be carried out in the methods or by an apparatus. It should be understood that these modifications to methods can be carried out in conjunction with other methods, and in combination with other modifications. The modifications, variations and additional steps discussed above may also be applied to the embodiments that discuss an apparatus.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
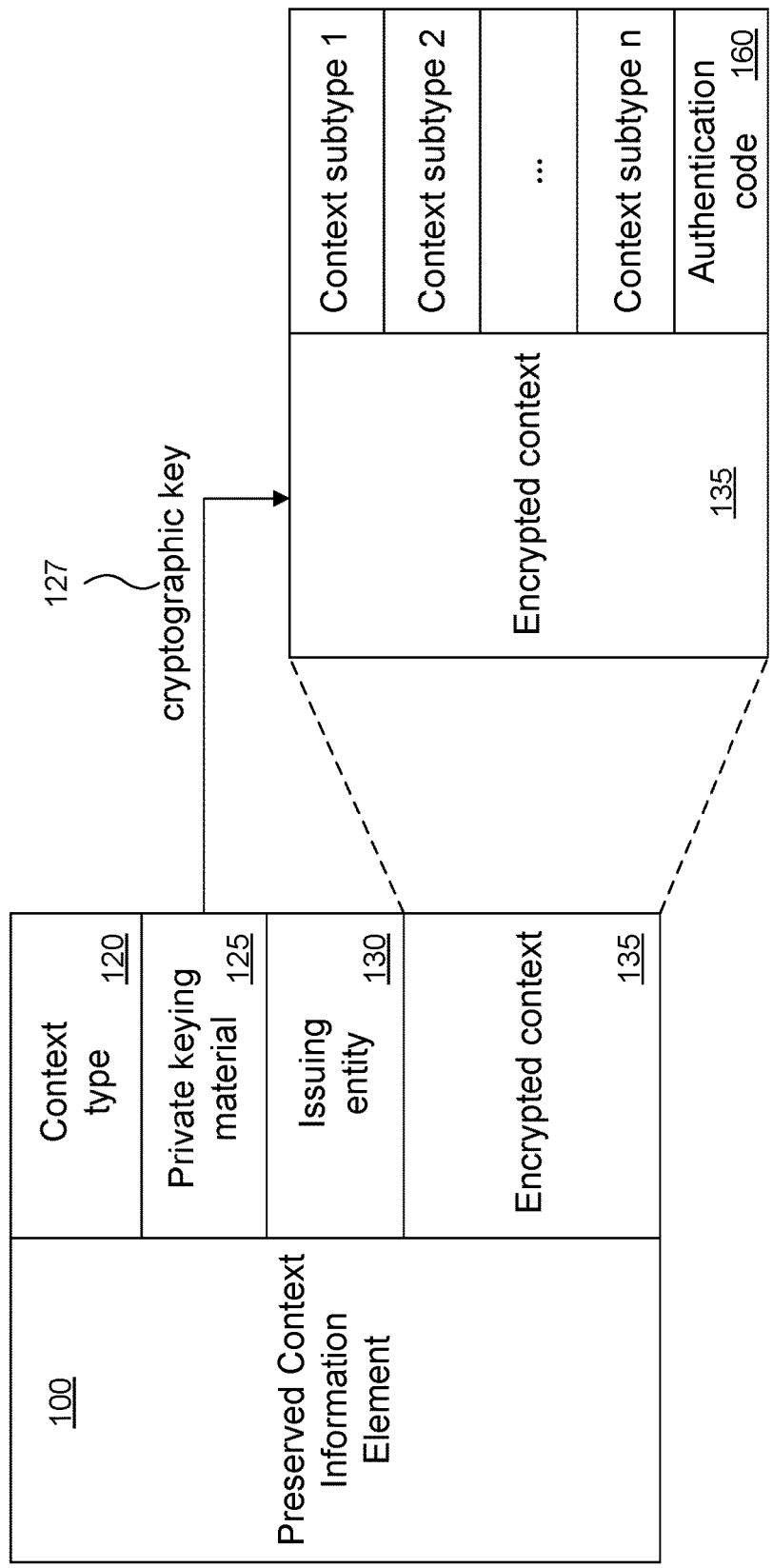
FIG. 1 illustrates a preserved context information element for storage in a mobile device, in accordance with an embodiment of the present invention.

As used herein, a "network" or "communication network" may service various devices including but not necessarily limited to mobile devices. Such a network may include a radio access portion and backhaul portion. The network may further comprise various virtualized components as will become readily apparent herein. An example of such a network is 5G network which is reconfigurable and capable of network slicing, as described below.

As used herein, the term "User Equipment" (UE) is used for purposes of clarity. However, the UE may refer to one of a variety of devices, generally referred to herein by the term "mobile devices" and including mobile stations, terminals or nodes, fixed or stationary devices, stations, terminals, or nodes, human-type communication devices, machine-type communication (MTC) devices, other wireless end nodes, or the like, which communicate with a radio access node via wireless communication. One skilled in the art will appreciate that a mobile device is a device designed to connect to a mobile network. This connection typically makes use of a wireless connection to an access node. Although the mobile network is designed to support mobility, it is not necessary that the mobile device itself be mobile. Some mobile devices, such as metering devices (e.g. smart meters) may not be capable of mobility, but still make use of the mobile network.

Network slicing refers to a technique for separating different types of network traffic which can be used in reconfigurable network architectures, such as networks employing Network Function Virtualization (NFV). A network slice (as defined in the Third Generation Partnership Project (3GPP) document numbered TR 22.891 and entitled "Study on New Services and Markets Technology Enablers," Release 14, Version 1.2.0, Jan. 20, 2016) is composed of a collection of logical network functions that supports the communication service requirements of particular use cases. One use of network slicing is in the core network of a Public Land Mobile Network (PLMN).

As used herein, the term "base station" may refer to an access node, access point, Node B, evolved Node B, 5G Node-B, or other form of radio access controller. Terms such as "radio access node" may refer to various types of such devices or nodes within the RAN which communicate with mobile devices to provide access to a communication network. In some embodiments, this communication with the mobile device may be performed over a wireless communication channel. Radio access nodes may also perform at least one of encoding and decoding operations, such as cryptographic operations. Alternatively, other nodes may perform these operations.

Embodiments of the present invention provide for a method and apparatus for use in communication between a mobile device and a wireless communication network, in which encrypted context information is provided to a mobile device for storage in memory thereof. On the communication network side, a device, such as a radio access node, or another node within the radio access network or core network, or a combination of network nodes or functions, may encrypt the context information, which is then wirelessly transmitted toward the mobile device for storage. A private cryptographic key usable for decrypting the context information may be stored in one or more devices of the communication network, and an indication of the cryptographic key may also be transmitted to, or toward, the mobile device for storage. The indication of the cryptographic key may comprise at least one of an identifier of the key (i.e. a key identifier) and an indication of the storage location of the cryptographic key within the communication network. The key identifier may be an index number or other value which is substantially unique to the key and usable to retrieve the key from memory, e.g. via a lookup operation. Correspondingly, the mobile device wirelessly receives and stores the encrypted context information along with other accompanying information, if applicable. As used herein, when data is held or stored in a device, it is typically stored in a memory device such as a non-volatile or volatile electronic memory. The appropriate type of memory used for storage in a given situation would be readily understood by a worker skilled in the art. The key indication is later provided by the mobile device to the network, where it is used to retrieve the cryptographic key. Upon retrieval, the cryptographic key is used, by a device in the network (other than the mobile device), to decrypt the encrypted context information.

Embodiments of the present invention provide for a framework for preserving context within the associated UE and including the self-stored UE context in a subsequent uplink transmission. Potential features of the framework include at least one of: limited resource usage in the RAN (and core network (CN)); secure storage of the preserved context; low overhead and limited delay to conclude a data transmission in a new serving cell; support for connectionless datagram transmission; and support for network slicing.

Furthermore, embodiments of the present invention employ a UE-centric distributed data storage model where each UE is responsible for storing its own context and for reporting the preserved context to a base station on an as-required basis. This self-stored UE context is desirably scalable with the number of UEs, because each UE preserves its own context. The self-stored UE context scheme is also robust, in that failure of a UE affects only that UE's context and failure of a network node (e.g. base station) does not necessarily affect the context preserved within the UE population. The self-stored UE context scheme may also be secure, in that context is preserved only within the related UE and is encrypted by the RAN to prevent tampering. The self-stored UE context scheme may also be cost effective, in that preserving context within the UE adds limited or zero incremental cost to the UE or to the network. The self-stored UE context scheme may also be efficient, in that preserved context is only reported to a base station when the base station needs it.

In various embodiments of the present invention, context information is used to process traffic associated with a UE and may include one or more of the following data: validity data defining constraints on use of context such as expiry time and service area; session keys (such as temporal keys) used for securing transmissions between a UE and other nodes in the communication network, e.g. for at least one of control plane and user plane, for at least one of uplink and downlink, and for at least one of privacy and authentication; dictionaries used for data compression; protocol header information used for protocol compression; protocol state machine context; subscription information; accounting information; authorised service information; service profile information; information related to access using a specific radio access technology; information related to access using a plurality of different radio access technologies; information required for ongoing monitoring of UE operations (e.g. lawful intercept, call tracing, location tracking, monitoring of data caps); slice context data (i.e. containing information used in) for processing slice-specific traffic associated with UE; and core network (CN) context data containing contextual information provided by CN functions (i.e. functions in a core network portion of the wireless communication network). The encrypted context information may include an authentication code usable for authenticating the encrypted context information and for cryptographically binding the context to the mobile device. Cryptographic binding may include incorporating a device identifier into an authentication code computation. Authentication may be performed following decryption of the encrypted context information, with the context information used only upon successful authentication.

Various embodiments of the present invention relate to use of the self-stored UE context for establishing or re-establishing secure or authenticated, (or secure and authenticated) wireless communication between the UE and the communication network. The UE may transmit the self-stored context to the communication network as part of the connection establishment/re-establishment. A connection-less form of communication may be provided, in which the context and the application data are transmitted concurrently.

Accordingly, in some embodiments, the mobile device wirelessly transmits a message which includes the encrypted context information and an indication of the cryptographic key usable for decrypting the context information. The message may be transmitted at a time when the mobile device is attempting to reconnect to the network. The message may be transmitted via a random access channel or other means. On the communication network side, the message may be received, the cryptographic key may be retrieved and the encrypted context information may be decrypted using the retrieved cryptographic key.

For uplink communication, the message may include encrypted uplink data, and the encrypted context information may include an indication of a further cryptographic key (also referred to herein as a further key), such as a session key or temporal key or part of a public/private key pair, usable for decrypting the encrypted uplink data. That is, the mobile device already possesses a cryptographic key which can be used to encrypt data, and the indication in the encrypted context information identifies the further cryptographic key that can be used to decrypt the data. The further cryptographic key may be explicitly included in the encrypted context information. On the communication network side, following decryption of the context information, the further cryptographic key may be identified and used to decrypt the uplink data. As such, some embodiments include encrypting uplink data and including the encrypted uplink data in the message, where the encrypted context information includes an indication of a further key usable for decrypting the encrypted uplink data. The further key may be stored in a network location and retrieved using the indication, similarly to storage and retrieval of the cryptographic key for the context information.

For downlink communication, when downlink data intended for the mobile device is received, it may be buffered and the mobile device paged. In response to the page the mobile device may transmit the encrypted context information, which is then decrypted at a node in the communication network. The encrypted context information may include an indication of a further cryptographic key, such as a session key or temporal key or part of a public/private key pair, for use in encrypting the downlink data in a manner which can be decrypted by the mobile device. That is, the mobile device already possesses a cryptographic key which can decrypt data which is encrypted using the further cryptographic key, and therefore transmits the encrypted context information which includes the indication of the further cryptographic key for use by a node in the communication network, such as a radio access node or other node. The downlink data is encrypted by the network node using the further cryptographic key and transmitted toward the mobile device. Upon receipt, the mobile device decrypts the downlink data using the key in its possession. This configuration has the following effect. The mobile device is able to self-store context information, including the further cryptographic key or an indication of the further cryptographic key (as required). When downlink data is available for the mobile device, the network is able to acquire the further cryptographic key (or the indication of the further cryptographic key) from the mobile device for subsequent use in encrypting the downlink data for wireless transmission to the mobile device. The further cryptographic key may be provided by the mobile device to the network in encrypted form. The further cryptographic key may be stored (e.g. in encrypted form) in the mobile device, or the further cryptographic key may be stored in the network at a location separate from the mobile device. This results in secure communication of both the further cryptographic key to the network and the downlink data to the mobile device. The secure communication is supported by the self-storage of context information at the mobile device.

Aspects of the invention related to securing self-stored UE context will now be discussed. In various embodiments of the present invention, the context information is stored in a memory component of the UE. The context information is encrypted by a node or function, or combination of nodes or functions in the communication network and the encrypted context information is wirelessly communicated to the UE for storage. The term "RAN" is used to refer to a node or function, or combination of nodes or functions in the communication network.

To secure the context preserved by a UE against improper modification or use, the RAN encodes the context within a secured information element before transferring the context to the UE. The preserved context within the secured information element is encrypted by the RAN and cryptographically bound to the UE. In various embodiments, the UE is not provided with the decryption key data, so that the contents of the secured information element cannot be readily interpreted by the UE. If the UE requires knowledge of some or all of the contextual information, this information may be provided to the UE by the RAN through a different operation.

The cryptographic key used to protect the preserved context may be a private key known only to elements within the RAN. Different keys may be used to secure context information for different UEs to mitigate the potential for a compromised key to be used to impersonate communications by another UE. If the context is to be updated, the RAN (e.g. the current serving base station) provides the UE with a new secured information element, possibly using a different private key.

A preserved context information element 100 used for secure self-storage of context is illustrated in FIG. 1. With reference to FIG. 1, the fields of the information element 100 include a context type field 120, which identifies the type of information contained within the encrypted context of the information element. A UE may be provided with one or more preserved context information elements with different information elements providing context for different aspects of the UE's operation. For example, a UE may be provided with one preserved context information element to be included in uplink user plane transmissions and a different preserved context information element to be included in uplink control plane transmissions. The preserved context information element(s) to be included in an uplink transmission by the UE may be explicitly requested by the RAN or by the CN, or may be determined from information broadcast by the RAN (e.g. the cell ID, PLMN ID, or indication in a System Information Block), or may be implicit in the procedure being followed by the UE.

The fields of the information element further include a private keying material field 125, which identifies the private key used to secure the preserved context. For example, the private key may be identified via an index value thereof. The private keying material may optionally include other information, such as but not limited to additional keying material and a reference to where the key is stored. The additional keying material may be a nonce, and may be usable to allow different (temporal) keys to be used for different (groups of) UEs. The reference to where the key is stored may be a key distribution centre.

The fields of the information element further include an issuing entity field 130, which identifies the node or function in the communication network, such as a RAN entity, that generated the preserved context. This may be used, for example, if a UE is mobile in a distributed RAN environment and may initiate an uplink transmission through any cell within a given service area.

The fields of the information element further include an encrypted context field 135, which contains the preserved context required by the issuing entity (or a similar function) to process radio link transmissions to and from this UE. The context is encrypted with a private key referenced by the private keying material 125. The contents of the preserved context are determined by the issuing entity and may change over time (e.g. due to a change in the UE's location or to a change in the UE's state).

In various embodiments, when the preserved context information element is provided to an appropriate node or function in the communication network, the data held in the private keying material field 125 can be used to identify the cryptographic key 127 that was used to encrypt the preserved context and to determine an appropriate cryptographic key usable for decrypting the encrypted context 135. Alternatively, the private keying material field 125 can be used to directly identify the cryptographic key 127 usable for decryption, without requiring intermediate identification of the corresponding encryption key.

The encrypted context 135 includes, among other data fields, an authentication code field 160, which contains an authentication code computed by the issuing entity. The authentication code is computed over other fields of the preserved context information element and is cryptographically bound to an identifier associated with the UE (e.g. by incorporating the identifier into the authentication code computation algorithm). The identifier (e.g. temporary mobile station identifier (TMSI)) either must be included in an uplink transmission from the UE (e.g. in a radio resource control (RRC) message or protocol data unit (PDU)) or must be inferred by the RAN (e.g. based on the radio resources used for the uplink transmission). Computation of the authentication code may also include or be based on other information known to both the UE and the communications network (e.g. PLMN identifier, cell identifier). Authentication may use a private key that is different from the key used for context encryption. In some embodiments, the authentication code may be a pre-determined value or signature known to the communications network that is not computed, thereby reducing computational requirements. The authentication code is included in the encrypted context as verification that the decrypted context information is valid and does not contain errors or irrelevant data or the results of an authentication code collision attack. The authentication code is a code which can be used to verify/authenticate use of the preserved context information by this UE, or to verify/authenticate the reliability/integrity of the context information, e.g. following decryption thereof.

Various embodiments of the present invention comprise transferring preserved context information to the UE via wireless communication, for storage by the UE. The preserved context information, following its creation by a node or function in the communication network, may be transferred from the RAN to a UE through a downlink transmission in various scenarios, for example as described below.

In some embodiments, the preserved context information may be transferred to the UE via a downlink RRC message over a signalling radio bearer. RRC messaging may be performed for example as described in 3GPP TS 36.331, "Evolved Universal Terrestrial Radio Access Network (E-UTRAN); Radio Resource Control (RRC) protocol specification", (e.g. Version 13.1.0, Apr. 1, 2016 ), hereinafter referred to as 3GPP TS 36.331. The transfer may be performed during initial attachment of the UE, during transition of the UE between operational modes (e.g. from active to dormant, from dormant to active), in response to a request for a new service, following creation or modification of a radio bearer connection, following creation or modification of a CN session, or during a handover operation.

In some embodiments, the preserved context information may be transferred to the UE as a media access control (MAC) control element in a downlink user plane PDU transmitted over a data radio bearer. MAC control elements may for example be as described in 3GPP TS 36.321, "Evolved Universal Terrestrial Radio Access Network (E-UTRAN); Medium Access Control (MAC) protocol specification" (e.g. Version 13.1.0, Apr. 1, 2016 ).

In some embodiments, the preserved context information may be transferred to the UE via pre-configuration. This may be the case for example in support of a mass deployment of MTC devices.

In various embodiments, the UE is aware of the UE identifier used by the RAN to generate the information element authentication code. This identifier may be pre-configured into the UE (e.g. an international mobile station identifier (IMSI)), or may be signalled to the UE during network attachment (e.g. a TMSI), or may be provided as an additional information element when the secured context is transferred to the UE. "Awareness" of data by a UE refers to the condition that the UE possesses the data in usable form, and is configured to access and use the data. When a UE is aware of certain data, it may or may not also be aware that the data is included in the preserved context information element.

The UE may be aware of some elements of the preserved context while other elements may be intended for use only by at least one of the RAN and the CN. For example, in the illustration of FIG. 2, the UE may be aware of the expiry time, the service area in which the context is valid, and the session key. However the slice context may be for use only by the RAN and therefore the UE may not be informed of same. When it is required to make the UE aware of information contained in the encrypted context, that information is communicated to the UE through another mechanism, such as in an RRC message. This may be desirable because the preserved context is encrypted by the RAN using a private key.

Figure 2:
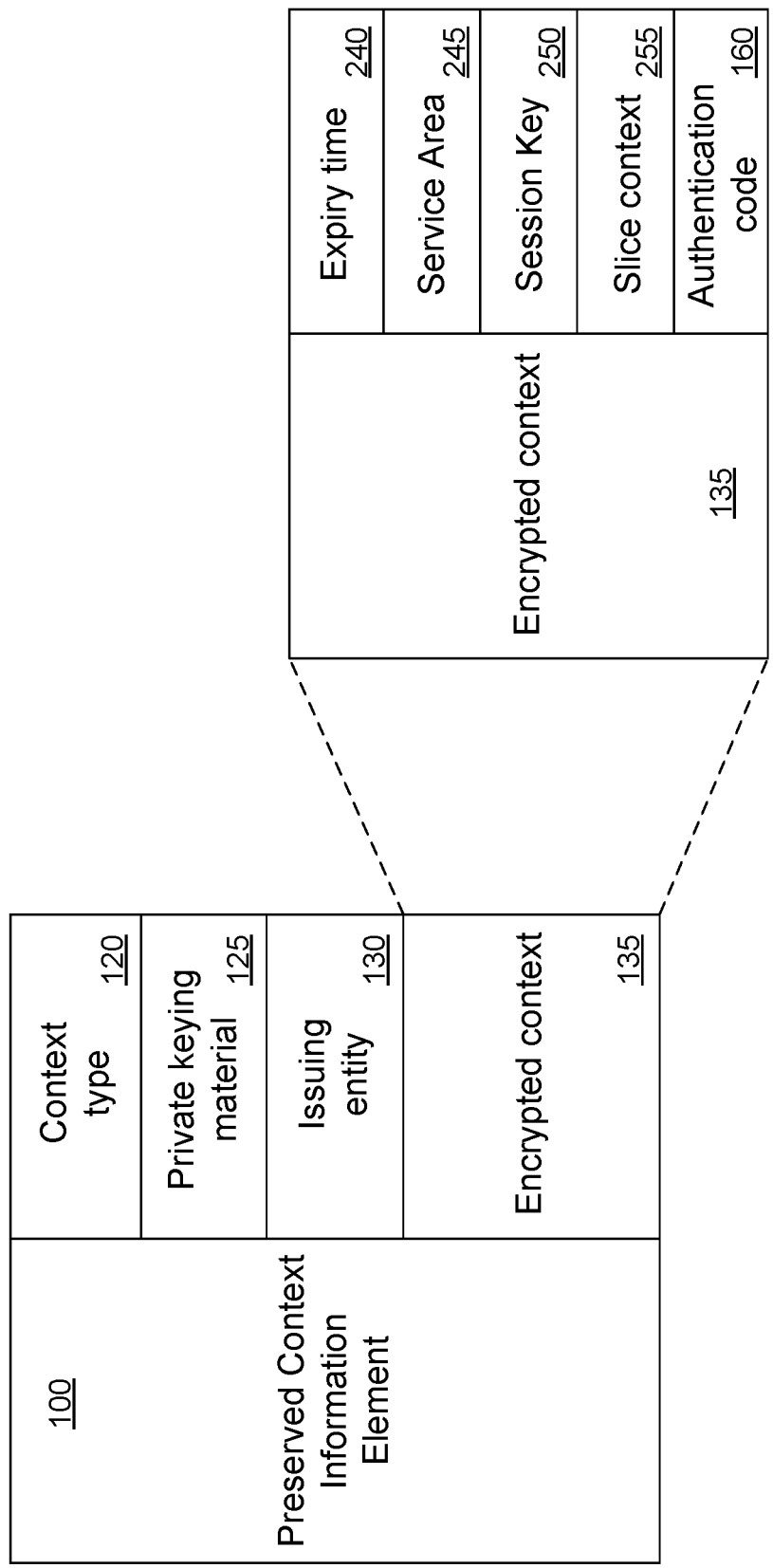
FIG. 2 illustrates a preserved context information element for storage in a mobile device, in accordance with another embodiment of the present invention.

In more detail, FIG. 2 illustrates a preserved context information element 100 and examples of the encrypted context 135 held thereby. In particular, in FIG. 2, the encrypted context 135 includes fields holding data corresponding to: an expiry time 240 indicative of a time at which the encrypted context is no longer valid; a service area 245 of the communication network in which the context is valid; a session key 250 containing or identifying the temporal cryptographic keys used for securing transmissions to the UE, from the UE, or both; and a slice context 255 containing information required to process slice-specific traffic associated with this UE.

Aspects of the present invention related to using a self-contained data PDU will now be discussed. Preserved context can be exchanged between a UE and the RAN using radio resource control plane signalling transmitted over a signalling radio bearer. In these instances, the preserved context information element is included as an information element (IE) within the RRC message.

Figure 3:
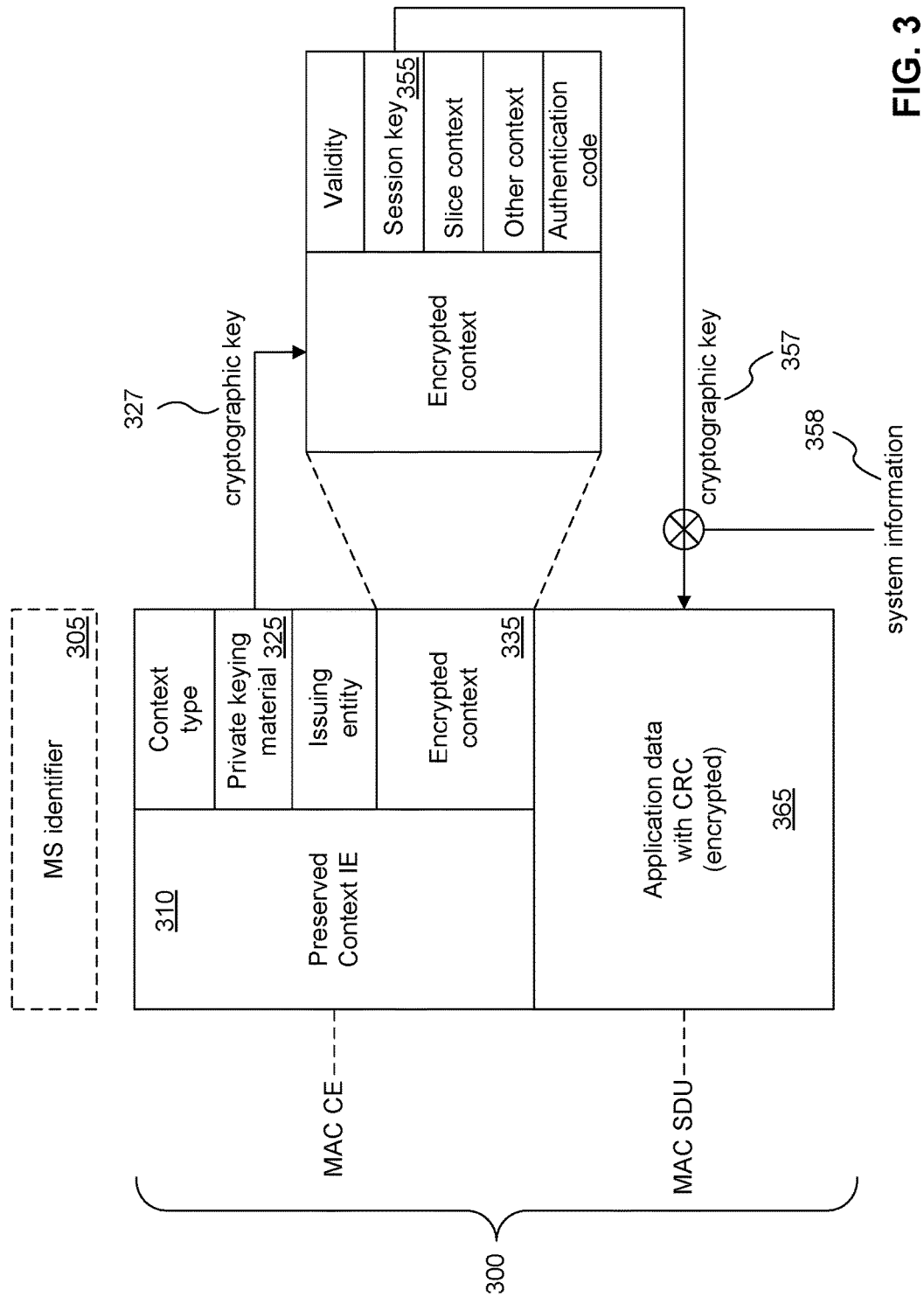
FIG. 3 illustrates a self-contained protocol data unit, in accordance with an embodiment of the present invention.

However, preserved context can also be included in a user plane protocol data unit (PDU) exchanged between a UE and the RAN over a data radio bearer. In various embodiments, the resulting self-contained data PDU includes all of the information necessary for the RAN to process a received PDU. This situation is described in more detail with respect to FIG. 3, which illustrates a self-contained data PDU 300 in detail.

A mobile station (MS) identifier 305 is provided, which is an identifier associated with the UE involved in the PDU exchange. The MS identifier 305 is configured to be the same identifier indicated by the RAN when transferring the authenticated context to the UE for preservation. For a scheduled uplink transmission over radio resources dedicated to the UE, the identity of the UE may be inferred by the RAN from the radio resources used for the transmission. For an unscheduled uplink transmission, the MS identifier may be included as an explicit MAC control element in the uplink PDU. In some embodiments, therefore, the MS identifier 305 forms part of the self-contained data PDU 300.

The self-contained data PDU 300 includes a preserved context information element 310. A MAC control element (CE) contains the secured preserved context information element 310. The preserved, encrypted context 335 embedded within the preserved information element 310 may have been encrypted by the RAN using the cryptographic key 327 indicated by the private keying material 325. Other details of at least one of the preserved context IE 310 and the encrypted context 335 may be as described with respect to FIGS. 1 and 2, for example.

The self-contained data PDU 300 further includes application data 365, which may include user plane information being exchanged between the UE and the RAN. When the application data is encrypted prior to transmission, the temporal session key used for encryption is the key included or identified in the session key field 355 of the encrypted context 335 of the preserved context information element 310. As noted previously, the UE may obtain the session key through a different procedure.

In various embodiments, the procedure used for encrypting the application data incorporates dynamic system information broadcast by the RAN (e.g. system frame number) to inhibit replay attacks.

In various embodiments, the application data field includes a Cyclic Redundancy Check (CRC), calculated over the application data field before encryption, which is encrypted along with the data; the CRC is validated after decryption to detect denial-of-service attacks that append irrelevant data to a copied preserved context. The CRC is one example of a verification code for validating integrity of the downlink data following decryption; other verification codes, for example a code produced by a hashing function or by a cryptographic message integrity check, may also be used. In this or another manner, the encrypted uplink data may include a verification code for validating integrity of the uplink data following decryption thereof.

The preserved context stored by a UE may be reported as a MAC control element in an uplink user plane PDU transmitted over an uplink data radio bearer. Similarly, the context to be preserved by a UE may be transferred as a MAC control element in a downlink user plane PDU transmitted over a downlink data radio bearer.

In operation, the private keying material 325 may be used by an internal entity of the communication network to retrieve a cryptographic key 327 usable for decrypting the encrypted context 335. The encrypted context includes a session key field 355 which includes or is used to identify a further cryptographic key 357. The further cryptographic key 357 is used, possibly when combined with further system information 358, to decrypt the application data 365. The system information 358 may include dynamic system information for inhibiting replay attacks.

Embodiments of the present invention can be used to perform at least one of connectionless uplink transmissions and connectionless downlink data transmissions, which include transmitting the self-contained PDU from the UE to the communication network. The preserved context information element of the self-contained PDU is used to establish the required context for the connectionless data transmission, while the (encrypted) application data may be used to convey the data of the connectionless data transmission. Further details related to example procedures for such connectionless data transmissions will be described below.

As used herein, the term "connectionless" as applied to data transmissions may refer to an arrangement in which, the protocol data unit being transmitted is handled based on the information carried in the protocol data unit (PDU), rather than pre-arranging how the data unit is to be handled. In some embodiments, the communications network may possess some of the required context information but not all of the required context information. Consequently, a data transmission may carry only those context types (for example as indicated in the context type field 120 of FIG. 1) required by the communication network in this situation.

Embodiments of the present invention comprise reporting a preserved context, stored in a UE, from the UE to the communication network. The preserved context may be reported from a UE to the RAN through an uplink transmission in various scenarios. For example, a preserved context information element may be included in an uplink RRC message over a signalling radio bearer or as a MAC control element in an uplink user plane PDU transmitted over a data radio bearer.

In some embodiments, the preserved context is reported via a control plane transmission. In this case, the UE includes preserved context information elements in an RRC message transmitted over a signalling radio bearer. For example, a preserved context information element may be included in an uplink RRC message during a connection or re-connection event; during transition between operational modes (e.g. from dormant to active); in a request for a new service; in a request for a new radio bearer connection; following creation or modification of a radio bearer connection; following creation or modification of a session; in a request for a new CN session; following a handover to a new serving cell; or following a radio link failure.

Although in various embodiments reporting of the preserved context occurs during connection or reconnection to the network (e.g. using a RRC-Connection-Request or RRC-ConnectionReestablishment-Request message), the preserved context information elements may also be included in other RRC messages as appropriate (e.g. RRC-Proximity-Indication, RRC-MeasurementReport, RRC-UEAssistanceInformation, RRC-UEInformationResponse, etc.).

In some embodiments, the preserved context is reported via a user plane transmission. The preserved context information element may also be included as a MAC control element in an uplink user plane PDU transmitted over a data radio bearer, for example. As such, a message from a mobile device which includes the encrypted context information (and in some embodiments also the key indication) can include an information element within a radio resource control message; a control plane transmission; or a user plane transmission.

In some embodiments, the preserved context information element is included in a scheduled uplink data transmission. When a UE transitions from a dormant mode to an active mode, the UE would normally be expected to provide preserved context information elements in the RRC message that triggers the transition (e.g. an RRC-Connection-Reestablishment message). However there may be situations where the RAN may (re-)request the preserved context information after the UE has completed the transition to an active mode of operation. While this request (and the subsequent response) can also be exchanged through control plane signalling using RRC messages, it may be more efficient to incorporate preserved context information into an uplink data PDU. For example, with a scheduled uplink data transmission, an uplink grant of dedicated radio resources (e.g. using downlink control information (DCI) format 0, (DCI 0)) that is transmitted by the RAN in the downlink control channel includes a "preserved context request" indication (DCI 0 and related information may be as described in 3GPP TS 36.212, "Evolved Universal Terrestrial Radio Access Network (E-UTRAN); Multiplexing and channel coding"). In some embodiments, if the UE receives an uplink grant with an indication to transmit its preserved context, the UE prepends MAC control elements containing the requested preserved context information elements to the uplink data PDU. In other embodiments, the UE can incorporate the MAC control elements into the uplink data PDU by appending the MAC control elements to the uplink data PDU. The UE may otherwise incorporate the MAC control elements into the uplink data PDU in a manner that allows for their extraction by another node.

In some embodiments, a scheduled uplink transmission allows the RAN to infer the identity of the UE from the radio resources used for the transmission. The inferred identity is then used by the RAN to authenticate the preserved context received from the UE.

In some embodiments, the preserved context information element is included in an unscheduled uplink data transmission. In some situations, a UE may be able to transmit an uplink data PDU without first receiving an uplink grant of dedicated radio resources from the RAN. This transmission may be performed, for example, over an uplink contention-based channel, for example as described in Kaijie Zhou, "Dynamic Resource Allocation for Machine-Type Communications in LTE/LTE-A with Contention-Based Access", April 2013.

In addition to the preserved context information elements, an unscheduled transmission of a self-contained uplink data PDU may be required to explicitly include the appropriate MS identifier as a MAC control element to allow authentication of the preserved context by the RAN.

Figure 4:
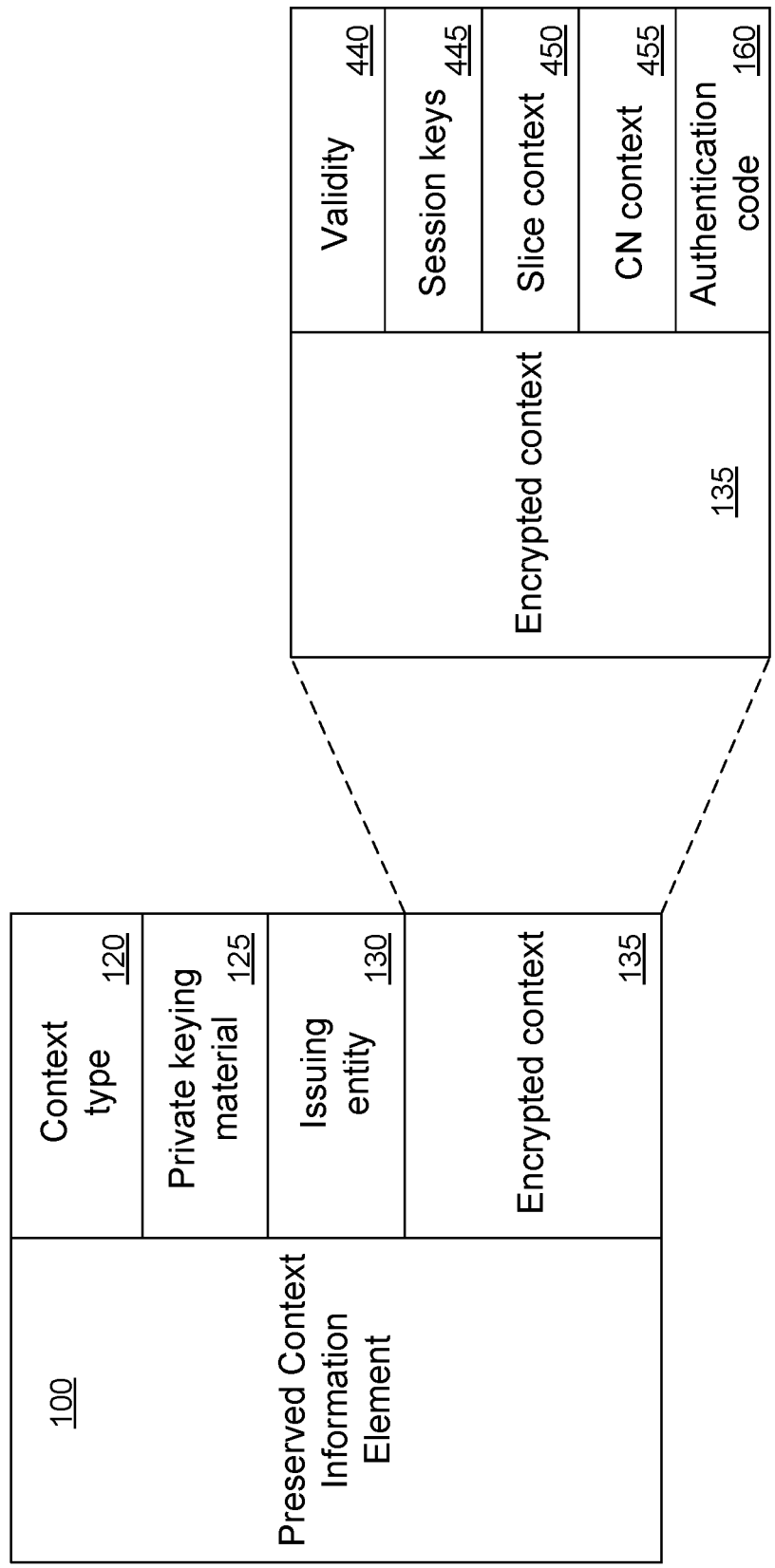
FIG. 4 illustrates a preserved context information element for storage in a mobile device, in accordance with another embodiment of the present invention.

A first example embodiment is described below, in relation to storage of a UE's context information by the UE itself. The self-stored context includes enough information to allow the RAN to recreate the UE-specific context necessary for processing at least one of transmissions to the UE and transmissions from the UE. For example, the preserved UE context (contained in one or more preserved context information elements) may include the information described below with reference to FIG. 4. FIG. 4 is similar to FIG. 2 except that several fields of the encrypted context are different.

The preserved context includes a validity field 440, which defines the constraints on use of this context. Such constraints may include at least one of: the valid lifetime of the preserved context, and the service area in which preserved context may be used.

The preserved context includes a session keys field 445, which contains or identifies the temporal keys used for securing at least one of transmissions to the UE and transmissions from the UE. The temporal keys may include at least one of: cryptographic keys for uplink user plane traffic; cryptographic keys for downlink user plane traffic; cryptographic keys for uplink control plane traffic; and cryptographic keys for downlink control plane traffic.

The preserved context includes a slice context field 450, which contains information required to process slice-specific traffic associated with this UE. This information may include at least one of: CN end points for user plane uplink traffic; CN end point for non-access stratum control plane uplink traffic; QoS parameters; and transport network layer (TNL) parameters. Further details may be found for example in U.S. patent application Ser. No. 15/590,580, entitled "Systems And Methods For Network Slice Attachment And Configuration", filed May 9, 2017, hereinafter referred to as Gage2016 and incorporated herein by reference.

The preserved context includes a CN context field 455, which contains contextual information provided by a CN function that is preserved by the UE and transparently relayed by the RAN. This information may include at least one of: accounting information; service profile information; and service- or slice-specific context.

Figure 5:
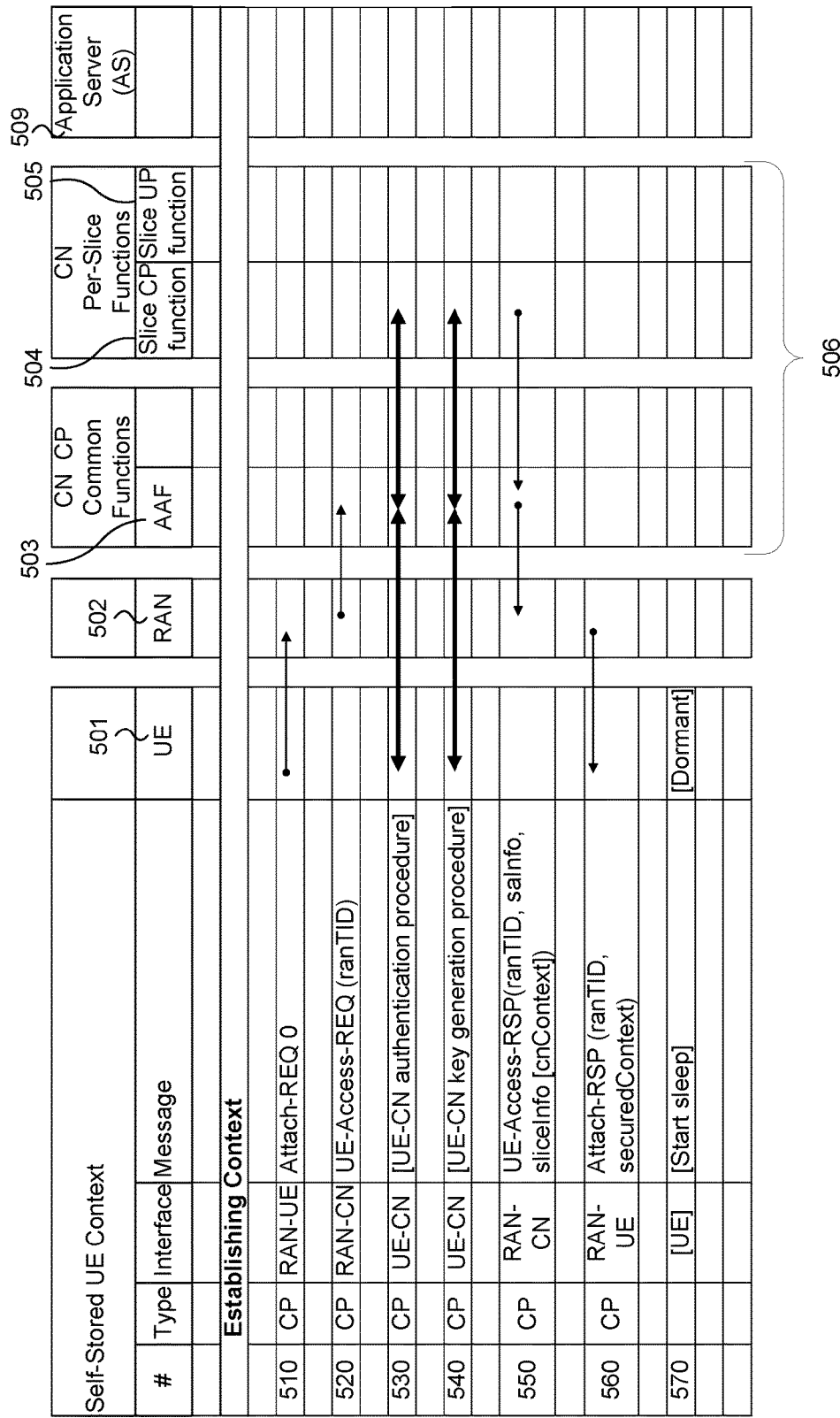
FIG. 5 illustrates a procedure for establishing context for a mobile device, in accordance with an example embodiment of the present invention.
Figure 6:
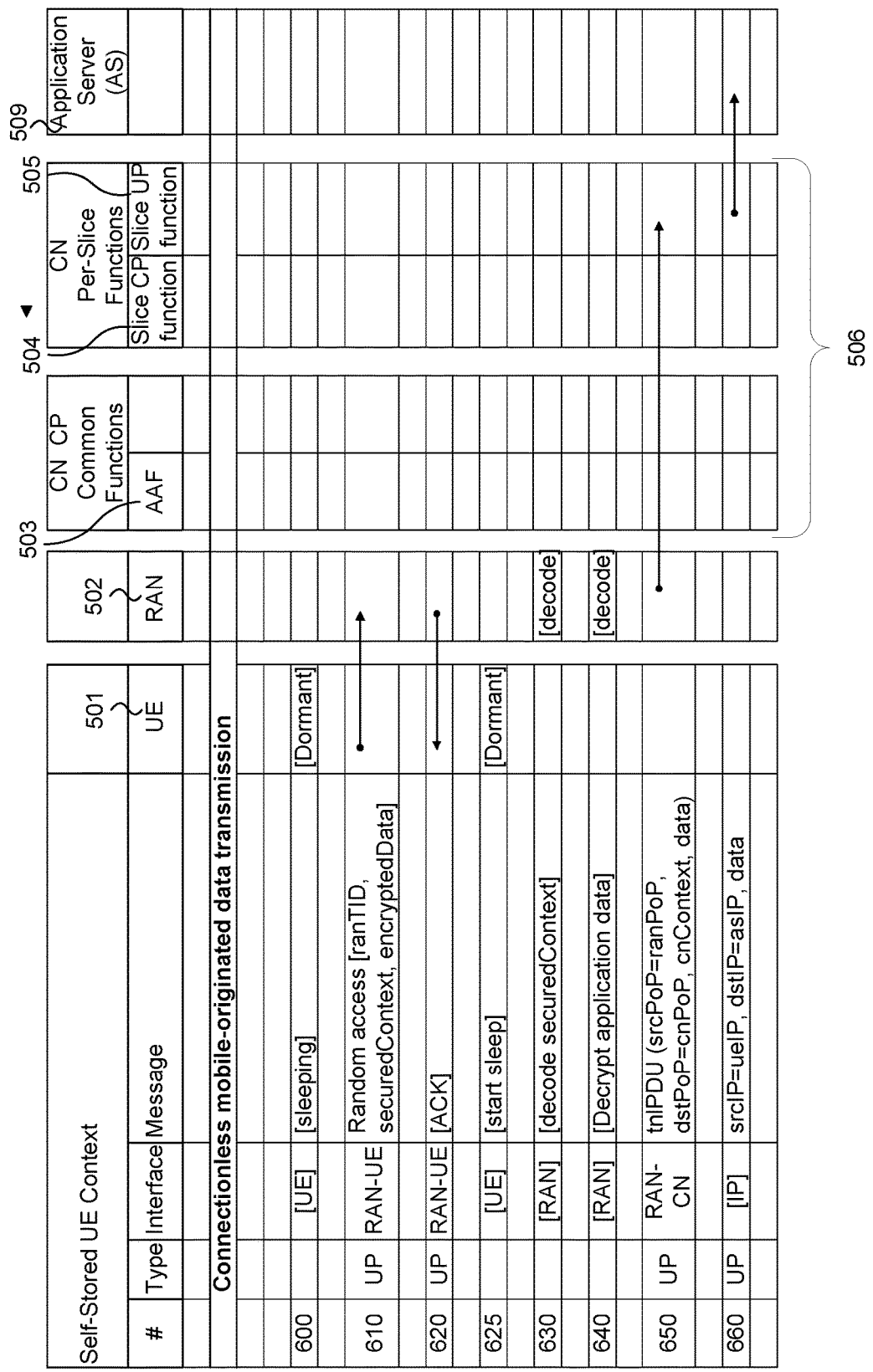
FIG. 6 illustrates a procedure for performing a connectionless uplink transmission, in accordance with an example embodiment of the present invention.
Figure 7:
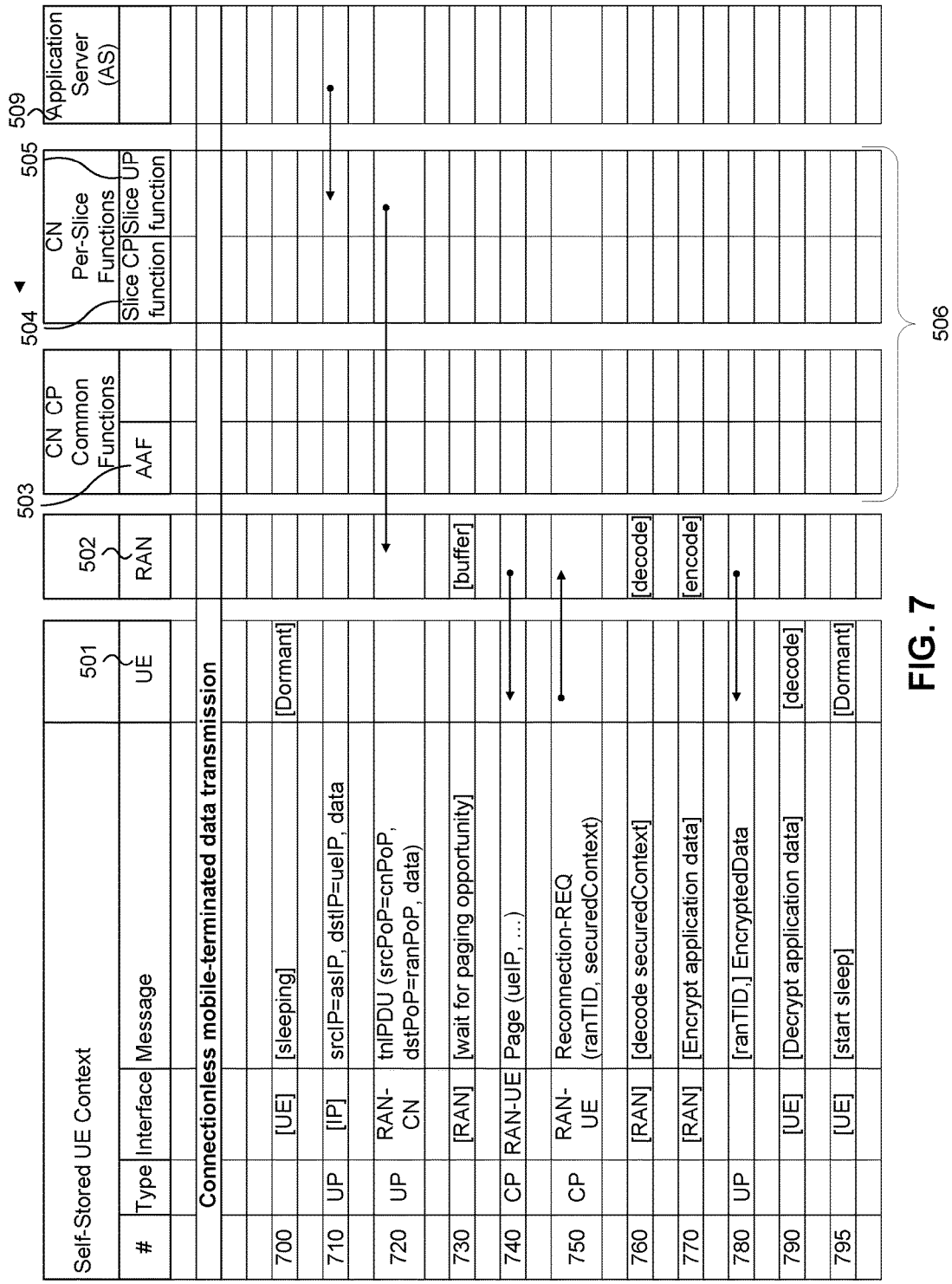
FIG. 7 illustrates a procedure for performing a connectionless downlink transmission, in accordance with an example embodiment of the present invention.

A high-level procedure for establishing context, according to an example embodiment of the present invention, is described below with respect to FIG. 5. In FIGS. 5 to 7: request messages in a protocol have names of the form "xxxx-REQ" and response messages in a protocol have names of the form "xxxx-RSP".

At the outset of the procedure, a UE 501 wirelessly transmits a control plane (CP) attach request (Attach-REQ) 510 to a node in the RAN 502 requesting attachment to the network.

In response to receipt of the attach request 510, a node in the RAN 502 sends a UE access request (UE-Access-REQ) 520 to a pre-determined CN CP function, such as an access authorisation function (AAF) 503, to authorise the attach request. This request includes a temporary identifier (ranTID) assigned to this UE 501 by the RAN 502. Communication between the RAN 502 and the functions in the core network may be via a backhaul network.

An authentication procedure 530 is also performed, in which the CN 506 determines the identity of the UE (e.g. IMSI), authenticates the UE, selects the default network slice for this (class of) UE, and determines whether the UE is authorised to attach to the network. This exchange is conducted over an encrypted connection established between the UE 501 and the CN 506 with the RAN 502 blindly relaying information between them. In various embodiments, at least one of authorization and authentication may involve per-slice CN CP functions 504.

Once the UE has been authenticated and authorised, the UE 501 and CN 506 execute a key generation procedure 540 that results in both the UE and CN determining at least one of: the temporal session keys to be used for securing uplink and downlink traffic over the radio link between the UE 501 and nodes of the RAN 502; and the master session key used to derive such temporal session keys.

The CN 506 sends a UE access response 550 (UE-Access-RSP) to the RAN 502 that includes: security association context (saInfo) resulting from authentication of the UE in operations 530 and 540, including at least one of: the temporal session keys; and the associated master session key; and network slice information (sliceInfo) (See Gage2016) describing where and how traffic from the UE 501 is to be forwarded by the RAN 502. In some embodiments, or optionally, CN context information (cnContext) contains information that may be used by the CN 506 when processing traffic from this UE 501. This context may be encrypted with a key known only to (certain functions within) the CN 506.

A node of the RAN 502 wirelessly transmits an attach response 560 (Attach-RSP) to the UE 501 that includes the temporary identifier assigned to the UE (ranTID) and an information element containing the secured context (securedContext) cryptographically bound to that identifier by the RAN 502. Upon receipt, the UE 501 stores the secured context information element in memory. When an extensive power-down is anticipated, the secured context information element may be stored in non-volatile memory.

Upon or after receipt of the attach response 560, the UE may enter a low-energy "sleep" state 570 to conserve battery power. Because the UE may be in this state for an extended period of time, it may not have any radio resources assigned for initiating an uplink transmission.

An example of a high-level procedure for performing a connectionless mobile-originated (uplink) transmission in accordance with an embodiment of the present invention is illustrated with respect to FIG. 6. The connectionless mobile-originated transmission may utilize self-stored context information. The connectionless mobile-originated transmission may be initiated by a UE 501 if, while dormant, it determines that it has data to send. A connectionless transmission may, for example, be used by an MTC device to minimise battery consumption or by an application requiring a low-latency communication.

The UE 501 is initially in a dormant mode 600. At a particular time, an event occurs within the UE that requires transmission of uplink data to an Application Server (AS) 509. The UE initiates a random access and connectionless user plane (UP) transmission 610 of a self-contained uplink PDU. The PDU includes: a UE identifier (ranTID) that is the same identifier that was assigned (in operation 560 of FIG. 5) during the initial attachment procedure; a preserved context information element previously received from the RAN 502 (in operation 560 of FIG. 5) containing the secured context; and the application data to be forwarded to the AS, encrypted with the session key derived in operation 540 of FIG. 5.

In some embodiments, if a node of the RAN 502 successfully receives the connectionless radio link PDU, it may provide an immediate acknowledgment 620 to the UE, 501 allowing the UE 501 to re-enter its low-energy "sleep" state 625 as soon as possible. Note that this is a radio link acknowledgement and is different from an end-to-end acknowledgement (if any) from the AS 509.

Further, the RAN 502 decodes/decrypts 630 and authenticates the preserved context information element using the private key identified in the information element. In a distributed RAN environment, the receiving base station may need to interact with the issuing entity or key distribution centre identified in the information element if the private key has not been previously distributed within the RAN 502.

If the preserved context information element is successfully authenticated, the RAN decrypts 640 the application data received in the connectionless radio link PDU using the session key contained or identified in the authenticated context.

If the application data is successfully decrypted (e.g. a valid cyclic redundancy check (CRC) was attached to the decrypted data), the RAN 502 uses the network slice context recovered from the preserved context information element to construct a transport network layer (TNL) PDU (tnlPDU) 650 to deliver the application data to (a network slice in) the CN 506. If the slice context indicates that no encapsulation of the application data is required (e.g. if the application data comprises a routable internet protocol (IP) packet), then the TNL PDU is the application data itself. Otherwise the RAN 502 uses the slice context to encapsulate the application data in a TNL PDU that includes (See Gage2016): the network slice point-of-presence (cnPoP) as the destination for the PDU; the corresponding RAN point-of-presence (ranPoP) as the source of the PDU; appropriate quality of service (QoS) markings; optionally, a CN context if this was included in the preserved context information element received from the UE 501; and the decrypted application data. The RAN 502 then forwards the (constructed) TNL PDU towards its destination.

The per-slice user plane functions 505 in the CN 506 process the received TNL PDU and eventually forward 660 the application data to the destination Application Server 509.

An example of a high-level procedure for performing a connectionless mobile-terminated (downlink) transmission in accordance with an embodiment of the present invention is illustrated with respect to FIG. 7. A connectionless mobile-terminated transmission may be initiated if a downlink packet is received by the RAN 502 while the UE 501 is dormant.

At a particular time, an event occurs within an Application Server (AS) 509 that requires transmission of downlink data to a UE 501. Because the state of the UE 501 is not known to the AS 509, the UE 501 may be in dormant mode 700 at this time.

When an IP packet is received 710 by the CN 506 with the UE's assigned IP address as the destination, the IP packet is processed (if necessary) by per-slice user plane functions 505 in the CN 506 and the application data is forwarded 720 to the RAN 502 inside a TNL PDU. If no encapsulation of the application data is required (e.g. if the application data comprises a routable IP packet), then the TNL PDU is the application data itself. Otherwise the RAN 502 receives the application data encapsulated inside a TNL PDU that includes (See Gage2016): a RAN point-of-presence (ranPoP) as the destination of the PDU; a network slice point-of-presence (cnPoP) as the source for the PDU; and the application data.

If the RAN 502 does not have an active connection to the target UE 501 (i.e. if the UE is dormant), the RAN buffers 730 the received PDU and waits for a paging opportunity.

At the next available paging opportunity, a paging message (or paging indication) is transmitted 740 to the UE 501 from all cells within the target tracking or paging area. Because the UE 501 is dormant and the RAN 502 does not have context stored for this UE, the target tracking or paging area may, for example, be determined from the RAN PoP (ranPoP) where the PDU was received and the paging opportunity schedule may, for example, be algorithmically determined from the IP address contained in the destination field (e.g. destination address) of the downlink packet. As such, when downlink data is received while the mobile device is dormant, the downlink data is stored and the paging indication is transmitted at a paging opportunity when the mobile device is capable of receiving the paging indication.

Because the UE 501 is dormant and the RAN 502 does not have context stored for this UE, the RAN is unable to perform a mapping between the UE IP address contained in the destination field of the downlink packet and the temporary identifier normally included in a paging record, such as a long term evolution (LTE) paging record. Therefore the RAN 502 creates a paging record with the UE IP address as the PagingUE Identity (See 3GPP TS 36.331 ). For example, the paging record may be formatted as follows:

```
PagingRecordList ::=   SEQUENCE (SIZE (1..maxPageRec)) OF
                       PagingRecord
PagingRecord ::=       SEQUENCE {
    ue-Identity            PagingUE-Identity,
    cn-Domain              ENUMERATED    {ps, cs},...
}
PagingUE-Identity ::=  CHOICE {
    s-TMSI                 S-TMSI,
    imsi                   IMSI,
    ipAddress              IP-Address,    -- NEW
    ...
}
```

Those skilled in the art will appreciate that not all the fields identified above need be specified in all embodiments. In one such embodiment, the cn-Domain portion of the PagingRecord may be omitted.

If the UE 501 receives the page, it responds with an RRC message 750 such as a reconnection request (Reconnection-REQ) that contains the preserved context information element (securedContext) and temporary identifier (ranTID) previously received from the RAN.

The RAN 502 decodes/decrypts 760 and authenticates the preserved context information element using the private key identified in the information element. In a distributed RAN environment, the receiving base station may need to interact with the issuing entity or key distribution centre identified in the information element if the private key has not been previously distributed within the RAN.

If the preserved context information element is successfully authenticated, the RAN encrypts 770 the application data received from the CN 506 using the session key contained or identified in the authenticated context.

The encrypted data is then transmitted 780 to the UE 501 using the received ranTID to identify the target UE. It is noted that successful authentication of the preserved context information element in step 760 may also be considered to be validation of the ranTID received from the UE 501. In some embodiments, the downlink transmission may be over a dedicated unicast channel (e.g. with the ranTID used to encode a downlink DCI) or over a point-to-multipoint broadcast channel (e.g. with the ranTID included in the downlink PDU).

If the application data is successfully decrypted 790 (e.g. a valid CRC was attached to the decrypted data), the UE 501 takes whatever application-specific action is required. Ultimately, the UE may re-enter its low-energy "sleep" state 795 and become dormant.

Figure 8:
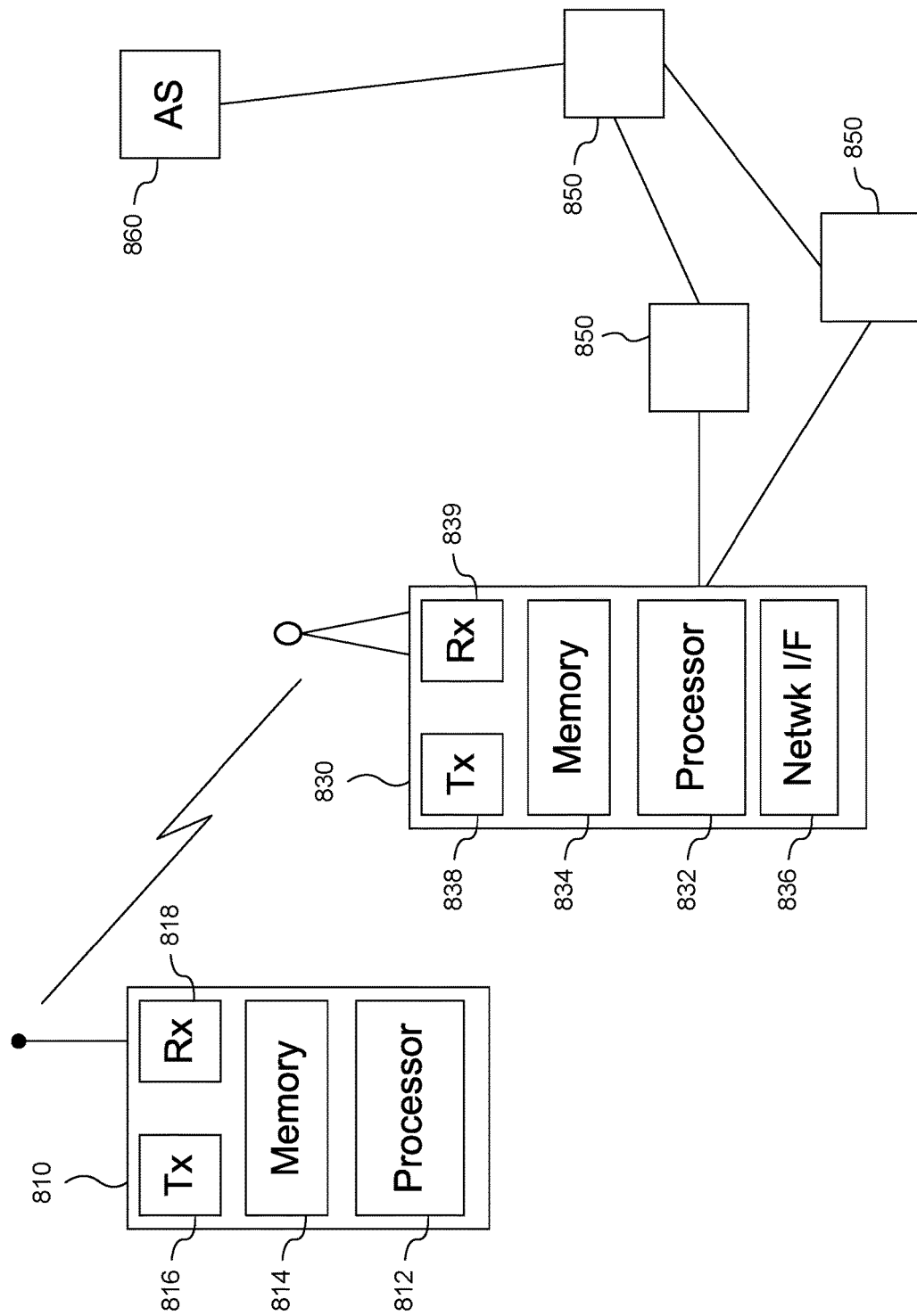
FIG. 8 illustrates a mobile device, radio access node and communication network, in accordance with an embodiment of the present invention.

FIG. 8 illustrates a mobile device 810 operatively coupled to a communication network, according to an embodiment of the present invention. The mobile device includes a processor 812, such as microprocessor, a memory 814, a wireless transmitter 816 and a wireless receiver 818. Wireless transmitter 816 and wireless receiver 818 may be considered to form a wireless network interface. The communication network includes a radio access node 830 having a processor 832, a memory 834, a network interface 836, a wireless transmitter 838 and a wireless receiver 839. In some embodiments the processor may be replaced at least partially with other electronic components, such as hardware or firmware components. Wireless transmitter 838 and wireless receiver 839 may be considered to form a wireless network interface.

The communication network further includes one or more nodes 850 of a core network which are communicatively coupled to the radio access node 830 via a backhaul communication link operatively coupled to the network interface 836 of the radio access node 830. The nodes 850 may implement various functions such as core network control plane functions, per-slice control plane functions, and per-slice user plane functions. Core network control plane functions may include an access authorisation function (AAF). Each of the nodes includes a processor, memory and network interface. A node may be a device such as a server or a virtualized device or a software function executing on a computation device. The communication network further includes or is operatively coupled to an application server 860 (AS) which hosts an application which interacts with a corresponding application operating on the mobile device 810. An apparatus provided according to embodiments of the present invention may comprise one or a combination of the radio access node 830 and the nodes 850. Different nodes may perform different functions, such as managing context storage and context restoring, communication with the mobile device, encryption, decryption, key storage and retrieval, etc.

Figure 9:
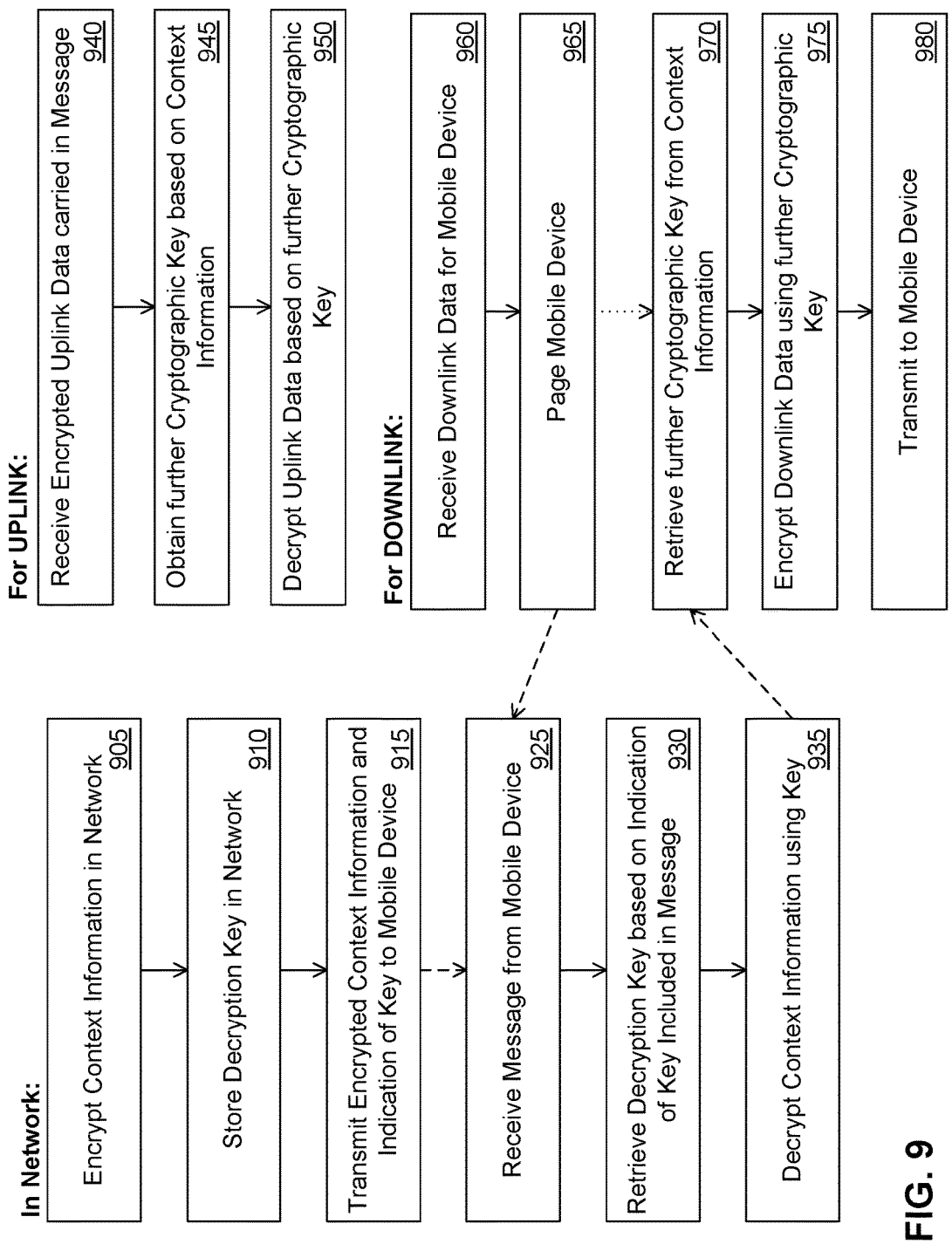
FIG. 9 illustrates a method for communication between a mobile device and a wireless communication network, in accordance with a communications network embodiment of the present invention.

FIG. 9 illustrates a method, performed by one or more network devices in a wireless communications network, for supporting communication between a mobile device and the wireless communication network. The method includes encrypting 905 context information using a network device in the wireless communication network separate from the mobile device, the context information corresponding to the mobile device. The method further includes storing 910 a key usable for decrypting the context information in a location which is separate from the mobile device. The method further includes wirelessly transmitting 915 the encrypted context information and an indication of the key to the mobile device for storage in the mobile device. The indication of the key may include at least one of the key identifier and the indication of the storage location of the key.

The operations described in association with this and other methods may be performed by a dedicated or virtualized network device, a combination of network devices, or node(s), function(s), or both nodes and functions, forming part of the infrastructure apparatus of the wireless communication network. In some embodiments, a radio access node performs at least part and possibly all of the method operations.

The method further includes wirelessly receiving 925 a message from the mobile device, the message including the encrypted context information and the indication of the key. The method further includes retrieving 930 the key based on the indication of the key, and using the retrieved key to decrypt 935 the encrypted context information. The message may include an identifier of or associated with the wireless device.

For supporting uplink communication, the received message further comprises encrypted uplink data, and the encrypted context information includes an indication of a further cryptographic key usable for decrypting the encrypted uplink data. In this case, the method further comprises receiving 940 the encrypted uplink data, obtaining 945 the further cryptographic key based on the encrypted context information following decryption, and decrypting 950 the encrypted uplink data using the obtained further cryptographic key.

For supporting downlink communication, the method further comprises receiving 960 downlink data intended for the mobile device, and wirelessly transmitting 965 a paging message (or paging indication) to the mobile device, wherein the message (received at 925) is transmitted from the mobile device in response to the paging message (or paging indication). The encrypted context information (following decryption at 935) includes an indication of a further cryptographic key for encrypting the downlink data in a manner which can be decrypted by the mobile device. The method then further comprises retrieving 970 the further cryptographic key from the encrypted context information following decryption, encrypting 975 the downlink data using the further cryptographic key and transmitting 980 the encrypted downlink data to the mobile device. The further cryptographic key used for decrypting uplink data and the further cryptographic key used for encrypting downlink data may be different cryptographic keys.

Figure 10:
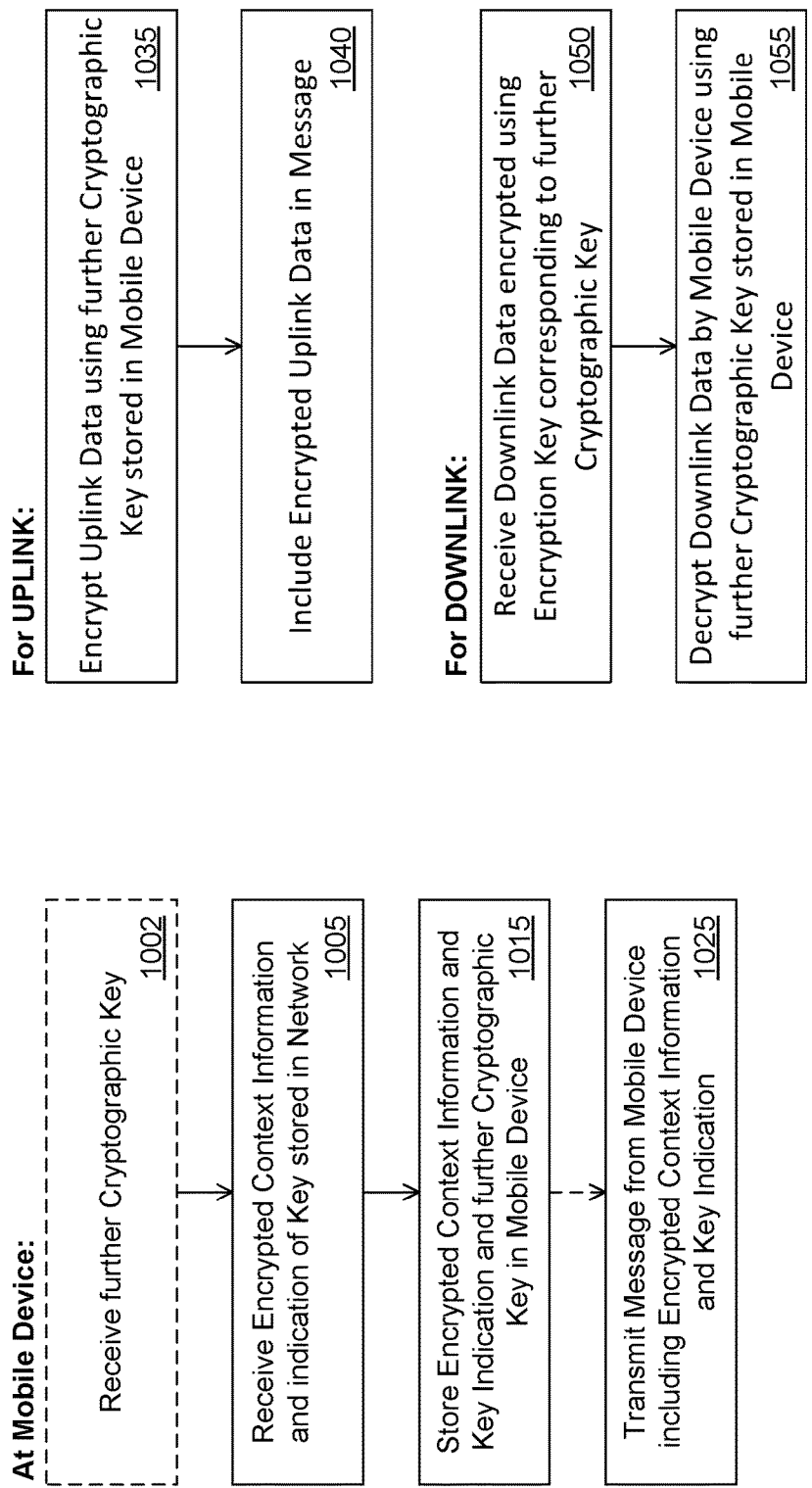
FIG. 10 illustrates a method for communication between a mobile device and a wireless communication network, in accordance with a mobile device embodiment of the present invention.

FIG. 10 illustrates a method, performed by a mobile device, for supporting communication between the mobile device and a wireless communication network. The method may include wirelessly receiving 1002 a further cryptographic key at the mobile device. The method includes wirelessly receiving 1005 encrypted context information and an indication of a key stored separately from the mobile device and usable for decrypting the context information. The method further includes storing 1015 the further cryptographic key, the encrypted context information and the indication of the key in the mobile device. In some embodiments the further cryptographic key may not be received immediately, and as such, it may be stored when received; the encrypted context information and the indication of the key may be stored in the mobile device without waiting for the reception of the further cryptographic key. In some embodiments, the further cryptographic key may not be required, and in this case reception and storage of the further cryptographic key may be omitted. For example, the further cryptographic key may not be required in implementations in which context information is encrypted, but further uplink and downlink data communication is not encrypted. The method subsequently includes wirelessly transmitting 1025 a message from the mobile device. The message includes the encrypted context information and the indication of the key, as retrieved from storage by the mobile device. The message may be transmitted 1025 from the mobile device in response to receipt of a paging indication, or in response to a trigger to send uplink data (e.g. application data) from the mobile device. The uplink data may be sent within the message or in a subsequent message.

For supporting uplink communication, the method may further comprise encrypting 1035 uplink data using the received 1002 further cryptographic key and including 1040 the encrypted uplink data in the message. The encrypted context information may include an indication of a decryption key corresponding to the further cryptographic key (i.e. usable for decryption of data encrypted using the further cryptographic key).

For supporting downlink communication, the method may further comprise wirelessly receiving 1050 downlink data encrypted using an encryption key corresponding to the received 1002 further cryptographic key, and decrypting 1055 the downlink data by the mobile device, using the further cryptographic key. In this case, the encrypted context information transmitted 1025 by the mobile device may include an indication of the encryption key corresponding to the further cryptographic key (e.g. an index value, location, or other information usable for retrieving the encryption key.) The further cryptographic key used for encrypting uplink data and the further cryptographic key used for decrypting downlink data may be different cryptographic keys.

Figure 11:
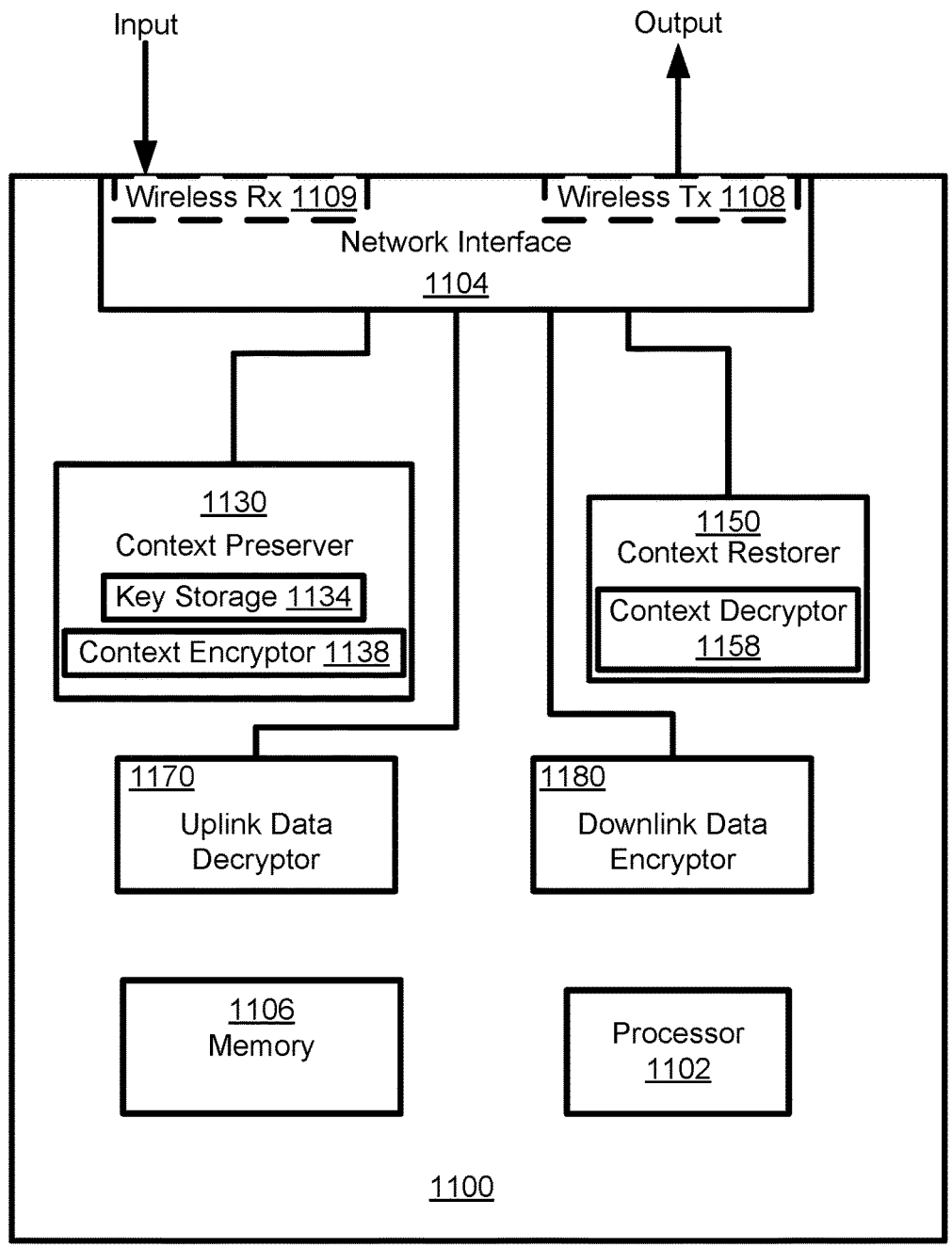
FIG. 11 illustrates a network infrastructure apparatus provided in accordance with an embodiment of the present invention.

FIG. 11 illustrates an infrastructure apparatus 1100 of a wireless communication network, in accordance with an embodiment of the present invention. The apparatus may be instantiated using one or more network devices or nodes, including but not limited to a radio access node or base station. The apparatus includes a processor 1102 (e.g. a computer processor/microprocessor), a network interface 1104, and a memory 1106. When the apparatus comprises a radio access node/base station, the network interface 1104 includes a wireless transmitter 1108 and wireless receiver 1109. The apparatus includes at least one of a context preserver 1130 and a context restorer 1150, which may be provided by cooperation of the processor, network interface, memory, and wireless transmitter and receiver. The context preserver is configured to transmit, toward a mobile device for storage thereby, encrypted context information corresponding to the mobile device, and an indication of a cryptographic key for decrypting the context information. The context preserver 1130 is further configured to initiate (and optionally also perform) storage of the cryptographic key usable in a location which is separate from the mobile device. The context preserver 1130 may further be configured to cause encryption of the context information. The context preserver may include a key storage location 1134 and a context information encryptor 1138.

The context restorer 1150 is configured to receive a message, the message including the encrypted context information and the indication of the cryptographic key. The context restorer 1150 is further configured to retrieve the cryptographic key from the key storage location 1134 based on the indication of the cryptographic key. The context restorer may include a context information decryptor 1158 configured to use the retrieved cryptographic key to decrypt the encrypted context information.

The apparatus 1100 may further include an uplink data decryptor 1170 configured to obtain, based on the decrypted context information, a further cryptographic key usable for decrypting encrypted uplink data, and to decrypt encrypted uplink data received by the decryptor 1170. The apparatus 1100 may further include a downlink data encryptor 1180 configured to obtain, based on the decrypted context information, a further cryptographic key usable for encrypting downlink data, and to encrypt the downlink data. The downlink data is then transmitted toward the mobile device.

Figure 12:
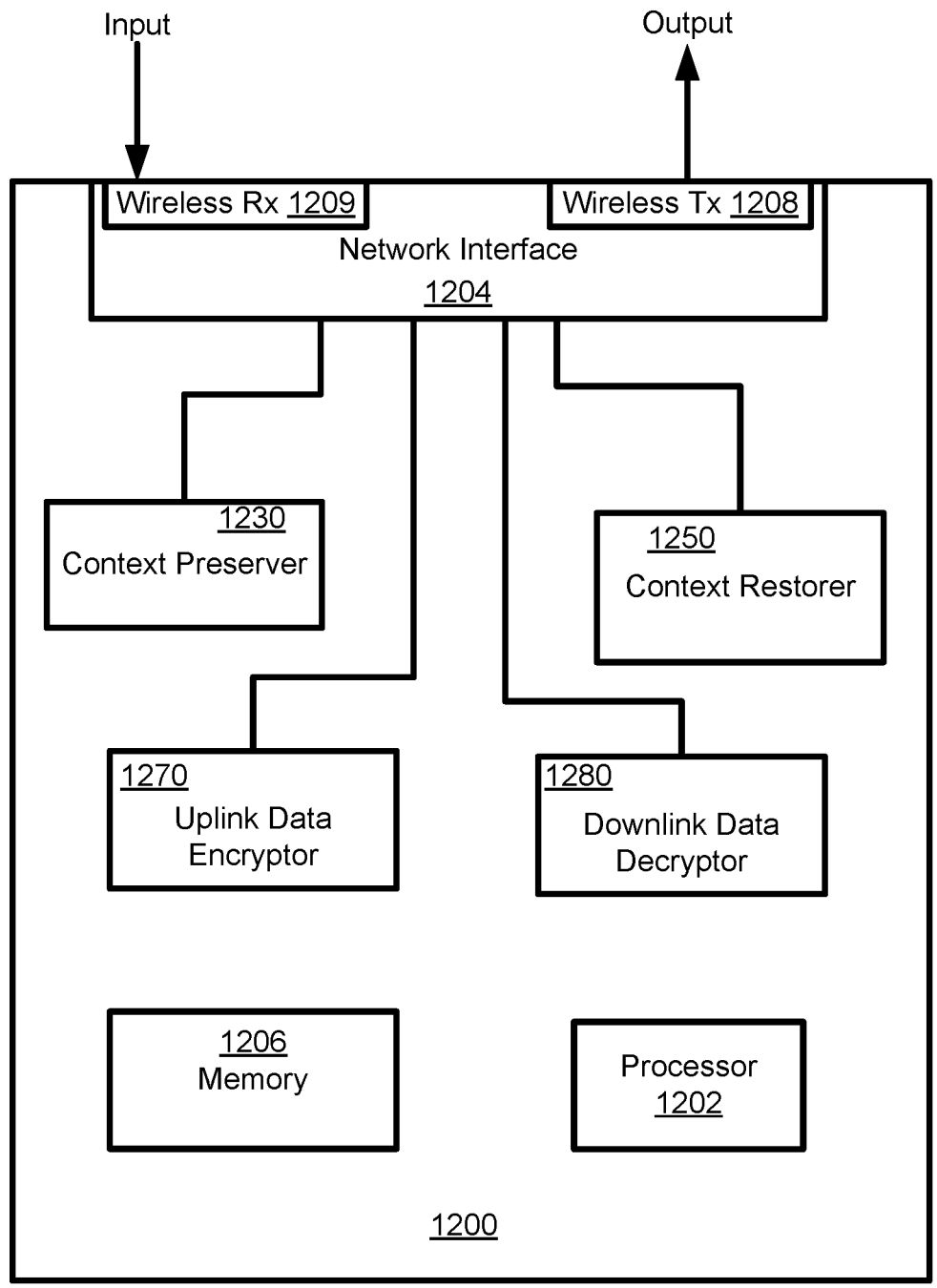
FIG. 12 illustrates a mobile device apparatus provided in accordance with an embodiment of the present invention.

FIG. 12 illustrates a device 1200 (e.g. a mobile device or UE) of a wireless communication network, in accordance with an embodiment of the present invention. The device includes a processor 1202 (e.g. a computer processor/microprocessor), a network interface 1204, and a memory 1206. The network interface 1204 includes a wireless transmitter 1208 and wireless receiver 1209. The device includes at least one of a context preserver 1230 and a context restorer 1250, which may be provided by cooperation of the processor, network interface, and memory. The context preserver 1230 is configured to wirelessly receive encrypted context information, wirelessly receive an indication of a cryptographic key stored in the network infrastructure and usable for decrypting the context information; and store the encrypted context information and the indication of the cryptographic key in the memory 1206. The context preserver 1230 is further configured to wirelessly receive a further cryptographic key, usable for at least one of encrypting and decrypting user data; and store the further cryptographic key in the memory 1206.

The context restorer 1250 is configured to wirelessly transmit encrypted context information corresponding to and previously stored by the mobile device. The context restorer 1250 is further configured to wirelessly transmit an indication of a cryptographic key, the indication stored by the mobile device and usable for retrieval of the cryptographic key (usable for decrypting the context information) from a storage location which is separate from the mobile device.

The device 1200 may further include an uplink data encryptor 1270 configured to encrypt uplink user data using a further cryptographic key stored in the memory 1206; and cause wireless transmission of the encrypted uplink user data. The encrypted context information includes an indication of a further cryptographic key usable for decrypting the encrypted uplink user data.

The device 1200 may further include a downlink data decryptor 1280 configured, upon wireless receipt of downlink user data encrypted using an encryption key, to retrieve the further cryptographic key from the memory 1206 and to decrypt the downlink user data using the further cryptographic key. The encrypted context information includes an indication of the encryption key corresponding to the further cryptographic key.

Various operations described herein involve a processor (e.g. microprocessor) operatively coupled to a memory. The processor executes stored program instructions (for example as stored in the memory) based on input data and provides output data resulting from execution of the program instructions. At least one of the input data, output data, and intermediate data may be stored in the memory or provided via data registers, input/output ports or electrical signals. Operations implemented at least in part by the processor include at least one of: encryption, decryption, authentication, cryptographic binding, memory storage or retrieval operations, monitoring and triggering operations, control of communication interfaces, and wireless transmitter and receiver operations. Various details and algorithms for performing certain operations, such as encryption and decryption tasks, would be readily understood by a worker skilled in the art.

Various operations described herein involve at least one of: a wireless transmitter, a wireless receiver, and a network interface. Various details and algorithms for performing communication operations using these components would be readily understood by a worker skilled in the art.

It will be readily understood that, throughout the preceding discussion, the above-described network functionalities and operations may correspond to a method for use in supporting operation a communication network, such as a wireless communication network. The method may involve computer-implemented functions, namely functions which are implemented by one or more computing, communication and memory components of the network infrastructure. These components may take various forms, such as specific servers or any of general-purpose computing, communication and memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and memory components of the network infrastructure, which may take various forms, such as specific servers or general-purpose computing, communication and memory devices which are configured to provide the required functionality through virtualization technologies. Various methods as disclosed herein may be implemented on one or more physical or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize physical and virtual computer resources. Such computer resources utilize, at a hardware level, a set of one or more computer processors (e.g. microprocessors), operatively coupled to a corresponding set of memory components which include stored program instructions for execution by the processors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for execution at a node in a wireless communication network, the method comprising:
   transmitting, toward a mobile device for storage thereon, both: context information associated with the mobile device and encrypted by a node in the wireless network different than the mobile device using an encryption key; and an indication of a location of a cryptographic key, the location being at a network node different than the mobile device, the context information, in encrypted form, including an authentication code for authenticating the context information and cryptographically binding the context information to the mobile device; and
   storing the cryptographic key at the indicated location, the cryptographic key associated with the encryption key and for decrypting the encrypted context information.

2. The method of claim 1, wherein the node is a radio access node.

3. The method of claim 1, wherein the context information includes one or more of:
   validity data defining constraints on use of context;
   session keys used for securing transmissions between the mobile device and other nodes in the communication network;
   dictionaries used for data compression;
   protocol header information used for protocol compression;
   protocol state machine context;
   subscription information;
   accounting information;
   authorised service information;
   service profile information;
   information related to access using a specific radio access technology;
   information related to access using a plurality of different radio access technologies;
   information required for ongoing monitoring of UE operations;
   slice context data for processing slice-specific traffic associated with mobile device; and
   core network context data provided by functions in a core network portion of the wireless communication network.

4. The method of claim 1, further comprising:
   wirelessly receiving a message, the message including the context information, in encrypted form, and the indication of the location of the cryptographic key;
   retrieving the cryptographic key based on the indication of the location of the cryptographic key; and
   using the retrieved cryptographic key to decrypt the encrypted context information.

5. The method of claim 4, wherein the message further comprises encrypted uplink data and wherein the context information includes an indication of a further cryptographic key for decrypting the encrypted uplink data, the method further comprising:
   obtaining the further cryptographic key based on the context information following decryption thereof; and
   decrypting the encrypted uplink data using the obtained further cryptographic key.

6. The method of claim 4, wherein the message is received in response to a paging indication, the paging indication transmitted in response to receipt of downlink data for the mobile device, and wherein the context information following decryption thereof includes an indication of a further cryptographic key for encrypting the downlink data in a form which is decryptable by the mobile device, the method further comprising: encrypting the downlink data using the further cryptographic key; and transmitting the encrypted downlink data toward the mobile device.

7. The method of claim 6, wherein the paging indication comprises a destination address included in an internet protocol (IP) packet associated with the downlink data.

8. The method of claim 1, wherein the context information and the indication of the cryptographic key comprises: an information element within a radio resource control message; a control plane transmission; or a control element within a user plane transmission.

9. A node of a wireless communication network, the node comprising:
   a network interface for transmitting data towards and receiving data from other nodes on the wireless communications network;
   a processor; and
   a memory for storing instructions that when executed by the processor cause the node to be configured to:
   transmit, toward a mobile device for storage thereon and using the network interface, both: context information associated with the mobile device and encrypted by a node in the wireless network different than the mobile device using an encryption key; and an indication of a location of a cryptographic key, the location being at a network node different than the mobile device, the context information, in encrypted form, including an authentication code for authenticating the context information and cryptographically binding the context information to the mobile device; and initiate storage of the cryptographic key at the indicated location, the cryptographic key associated with the encryption key and for decrypting the encrypted context information.

10. A node of a wireless communication network, the node comprising:
   a network interface for transmitting data towards and receiving data from other nodes on the wireless communications network;
   a processor; and
   a memory for storing instructions that when executed by the processor cause the node to be configured to:
   wirelessly receive from a mobile device, using the network interface, encrypted context information corresponding to the mobile device, and an indication of a cryptographic key for decrypting the encrypted context information, the encrypted context information including an authentication code for authenticating the context information and cryptographically binding the context information to the mobile device; and
   retrieve the cryptographic key from a network node different than the mobile device and based on the indication, the retrieved cryptographic key used for decrypting the encrypted context information.

11. The node of claim 10, further configured, upon receipt of encrypted uplink data, wherein the context information following decryption thereof includes an indication of a further cryptographic key for decrypting the encrypted uplink data, to:
   obtain the further cryptographic key based on the context information following decryption thereof; and
   decrypt the encrypted uplink data using the obtained further cryptographic key.

12. The node of claim 10, wherein the context information following decryption thereof includes an indication of a further cryptographic key for encrypting downlink data in a form which is decryptable by the mobile device, the node further configured to: encrypt the downlink data using the further cryptographic key; and transmit the encrypted downlink data toward the mobile device.

13. A method, in a mobile device, for communication between the mobile device and a wireless communication network, the method comprising:
   wirelessly transmitting, from the mobile device, encrypted context information corresponding to and stored by the mobile device, the encrypted context information including an authentication code for authenticating the context information and cryptographically binding the context information to the mobile device; and
   wirelessly transmitting, from the mobile device, an indication of a cryptographic key, the indication stored by the mobile device and used by the wireless communication network for retrieval of the cryptographic key, the cryptographic key stored separately from the mobile device and for decrypting the context information.

14. The method of claim 13, further comprising:
   wirelessly receiving, by the mobile device, the encrypted context information and the indication of the cryptographic key, and storing the encrypted context information and the indication of the cryptographic key in the mobile device.

15. The method of claim 13, wherein the encrypted context information comprises further cryptographic information associated with a further cryptographic key, the further cryptographic information comprising: an indication of the further cryptographic key; or an encryption key or decryption key corresponding to the further cryptographic key.

16. The method of claim 15, further comprising: encrypting uplink data using the further cryptographic key and wirelessly transmitting the encrypted uplink data.

17. The method of claim 16, wherein the uplink data comprises a verification code for validating integrity of the uplink data following decryption thereof.

18. The method of claim 13, wherein the encrypted context information comprises an authentication code for authenticating one or both of: the context information following decryption thereof; and the mobile device.

19. The method of claim 13, wherein the encrypted context information and the indication of the cryptographic key are transmitted from the mobile device in response to a wirelessly received paging indication.

20. The method of claim 13, wherein the encrypted context information comprises an indication of a further cryptographic key held by the mobile device, the method further comprising: wirelessly receiving encrypted downlink data decryptable using the further cryptographic key; and decrypting the downlink data by the mobile device.

21. The method of claim 13, wherein the encrypted context information and the indication of the cryptographic key comprises: an information element within a radio resource control message; a control plane transmission; or a control element in a user plane transmission.

22. A mobile device communicatively coupled to a wireless communication network, the mobile device comprising:
   a wireless transmitter for transmitting data towards other nodes on the wireless communications network;
   a wireless receiver for receiving data from other nodes on the wireless communications network;
   a processor; and
   a memory for storing instructions that when executed by the processor cause the mobile device to be configured to:
   wirelessly transmit encrypted context information corresponding to and stored by the mobile device, the encrypted context information including an authentication code for authenticating the context information and cryptographically binding the context information to the mobile device; and
   wirelessly transmit an indication of a cryptographic key, the indication stored by the mobile device and used by other nodes on wireless communication network for retrieval of the cryptographic key, the cryptographic key stored separately from the mobile device and for decrypting the context information.

23. The mobile device of claim 22, further configured, prior to wireless transmission of the encrypted context information and the indication of the cryptographic key, to wirelessly receive the encrypted context information and the indication of the cryptographic key, and store the encrypted context information and the indication of the cryptographic key in the memory.

24. The mobile device of claim 22 wherein the mobile device is a User Equipment.

* * * * *